United States Patent
Hussa

(10) Patent No.: US 11,316,767 B2
(45) Date of Patent: Apr. 26, 2022

(54) COMMUNICATION OF PARTIAL OR WHOLE DATASETS BASED ON CRITERION SATISFACTION

(71) Applicant: NOKIA TECHNOLOGIES OY, Espoo (FI)

(72) Inventor: Timo Tero Joonas Hussa, Haapavesi (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 17/184,135

(22) Filed: Feb. 24, 2021

(65) Prior Publication Data
US 2021/0273867 A1  Sep. 2, 2021

(30) Foreign Application Priority Data
Mar. 2, 2020 (FI) .................................. 20205217

(51) Int. Cl.
| | |
|---|---|
| H04L 12/26 | (2006.01) |
| H04L 5/00 | (2006.01) |
| H04L 7/00 | (2006.01) |
| H04L 43/0817 | (2022.01) |
| H04L 43/0852 | (2022.01) |
| H04L 43/0882 | (2022.01) |

(52) U.S. Cl.
CPC ........ *H04L 43/0817* (2013.01); *H04L 5/0032* (2013.01); *H04L 7/0079* (2013.01); *H04L 7/0091* (2013.01); *H04L 43/0852* (2013.01); *H04L 43/0882* (2013.01)

(58) Field of Classification Search
None
See application file for complete search history.

(56) References Cited

U.S. PATENT DOCUMENTS

| 4,261,018 A | 4/1981 | Knowlton |
|---|---|---|
| 6,212,175 B1 | 4/2001 | Harsch |
| (Continued) | | |

FOREIGN PATENT DOCUMENTS

| CN | 102165776 A | 8/2011 |
|---|---|---|
| CN | 103369643 A | 10/2013 |
| (Continued) | | |

OTHER PUBLICATIONS

Office Action and Search Report dated Jun. 18, 2020 corresponding to Finnish Patent Application No. 20205217.
(Continued)

*Primary Examiner* — Joshua Joo
(74) *Attorney, Agent, or Firm* — Squire Patton Boggs (US) LLP

(57) ABSTRACT

Various example embodiments relate to partial data transmission. A transmitter may receive at least one dataset for transmission. The dataset may be one of a plurality of datasets known to the transmitter and a receiver or to be signaled to the receiver. The transmitter may determine a first portion of the dataset. The size of the first portion may be determined based on a battery level indicator, a latency level associated with the dataset, a radio condition, or a network load. The receiver may recognize the dataset based on the first portion and/or at least one second portion transmitted by the transmitter. Apparatuses, methods, and computer programs are disclosed.

6 Claims, 11 Drawing Sheets

(56) References Cited

U.S. PATENT DOCUMENTS

| | | | |
|---|---|---|---|
| 6,463,042 | B1 | 10/2002 | Paatelma |
| 7,574,240 | B1 | 8/2009 | Jenkins, IV |
| 8,065,540 | B2 | 11/2011 | Sultenfuss |
| 9,813,467 | B1 | 11/2017 | Barrett et al. |
| 9,946,571 | B1 | 4/2018 | Brown et al. |
| 10,117,289 | B2 | 10/2018 | Liu et al. |
| 10,381,915 | B1 | 8/2019 | Dusmez |
| 2003/0186724 | A1 | 10/2003 | Tsutsumi et al. |
| 2004/0002367 | A1 | 1/2004 | Chanut |
| 2004/0072559 | A1 | 4/2004 | Kakumaru et al. |
| 2005/0030914 | A1 | 2/2005 | Binzel et al. |
| 2005/0048960 | A1 | 3/2005 | Yamauchi et al. |
| 2011/0213815 | A1* | 9/2011 | Davis ............. G06F 16/166 707/827 |
| 2013/0170426 | A1 | 7/2013 | Ukita et al. |
| 2013/0201887 | A1 | 8/2013 | Goto |
| 2014/0347507 | A1 | 11/2014 | Yanagidate |
| 2014/0362702 | A1 | 12/2014 | Luna |
| 2015/0131453 | A1 | 5/2015 | Tofighbakhsh et al. |
| 2016/0150006 | A1 | 5/2016 | Sen et al. |
| 2018/0110053 | A1 | 4/2018 | Wei |
| 2018/0152360 | A1 | 5/2018 | Norum |
| 2018/0232387 | A1 | 8/2018 | Boutnaru |
| 2019/0165894 | A1 | 5/2019 | Choi et al. |
| 2019/0312927 | A1* | 10/2019 | Shalunov ............ H04L 67/1091 |
| 2019/0380093 | A1 | 12/2019 | Ang et al. |
| 2020/0177322 | A1* | 6/2020 | Xu ........................ H04L 1/1822 |
| 2020/0200827 | A1* | 6/2020 | Cornwall ........... G01R 31/3646 |
| 2021/0058851 | A1* | 2/2021 | Hua ...................... H04W 76/50 |

FOREIGN PATENT DOCUMENTS

| | | |
|---|---|---|
| CN | 103843415 A | 6/2014 |
| CN | 104303586 A | 1/2015 |
| CN | 107329559 A | 11/2017 |
| CN | 108234048 A | 6/2018 |
| GB | 2400911 A | 10/2004 |
| JP | 10-145445 A | 5/1998 |
| JP | 2001-103230 A | 4/2001 |
| JP | 2003-087863 A | 3/2003 |
| JP | 2004-064458 A | 2/2004 |
| JP | 2012-095128 A | 5/2012 |
| JP | 2017-224174 A | 12/2017 |
| KR | 20000042503 A | 7/2000 |
| KR | 20180018286 A | 2/2018 |
| KR | 20180108363 A | 10/2018 |
| KR | 20190038300 A | 4/2019 |
| WO | WO 90/13966 A1 | 11/1990 |
| WO | WO 99/45710 A1 | 9/1999 |
| WO | WO 2010/035024 A1 | 4/2010 |
| WO | WO 2012/073059 A1 | 6/2012 |
| WO | WO 2018/174530 A1 | 9/2018 |
| WO | WO 2019/158082 A1 | 8/2019 |

OTHER PUBLICATIONS

Office Action dated Nov. 19, 2020 corresponding to Finnish Patent Application No. 20205217.

Communication of Acceptance under section 29a of Patents Decree dated Feb. 22, 2021 corresponding to Finnish Patent Application No. 20205217.

Dave Johnson, "How Low Data Mode works on an iPhone, and how you can use it to save cellular data or Wi-Fi bandwidth," Business Insider, Dec. 17, 2020, www.businessinsider.com/how-to-use-low-data-mode-on-iphone?r=US&IR=T.

"How to Optimize Video Quality While on Battery Windows 10," Windows 10 Tips, How to Connect, 2021, www.howto-connect.com/optimize-video-quality-while-on-battery-windows-10/.

Chris Hoffman, "How to Use Low Power Mode on an iPhone (and What Exactly It Does)," How-to Geek, Apr. 3, 2018, www.howtogeek.com/229224/how-to-use-low-power-mode-on-an-iphone-and-what-exactly-it-does/.

Extended European Search Report issued in corresponding European Patent Application No. 21158623.5-1202 dated Jun. 29, 2021.

* cited by examiner

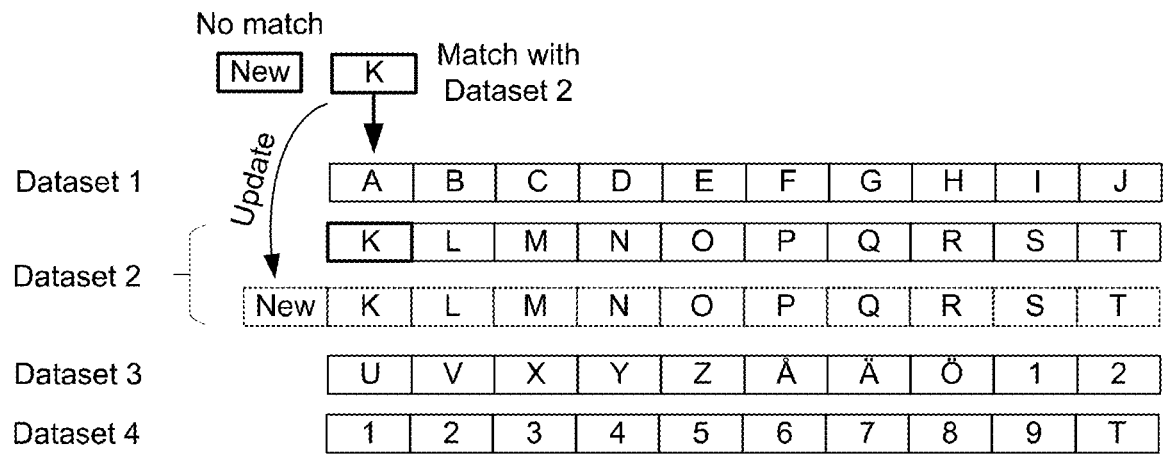

FIG. 10

| | | | |
|---|---|---|---|
| 0 | 0 | 0 | Block(s) until next signaled block(s) are "0" content |
| 0 | 0 | 1 | Block(s) until next signalled block(s) are not same |
| 0 | 1 | 0 | Block(s) until next signalled block(s) are "1" content |
| 0 | 1 | 1 | Block(s) until next signalled block(s) are same |
| 1 | 0 | 0 | Block(s) until next signalled block(s) are "0" content |
| 1 | 0 | 1 | Block(s) until next signalled block(s) are not same |
| 1 | 1 | 0 | Block(s) until next signalled block(s) are "1" content |
| 1 | 1 | 1 | Block(s) until next signalled block(s) are same |

Indicates observation direction
(e.g. 0=towards left, 1=towards right)

FIG. 11

| TX | Message received in IoT device | Message transmitted to | Order of msg | Received from | Sent msgs (1-10) | Battery level (%) | Chain | Time received | Time sent | Type | Size | Bits | Total size sent | Terminate chain if last msg not received within 30 s |
|---|---|---|---|---|---|---|---|---|---|---|---|---|---|---|
| A1 | No | Server1 | 1 | No | 1 | Low (15) | Text 1000 | | 01012020-20:00:36 | Text | 1/10 | | 1/10 | Continue |
| A1 | Yes | Server1 | 2 | Server1 | 2 | Low (15) | Text 1000 | 01012020-20:00:46 | 01012020-20:00:56 | Text | 1/10 | | 2/10 | Continue |
| A1 | Yes | Server1 | 3 | Server1 | 3 | Low (14) | Text 1000 | 01012020-20:01:06 | 01012020-20:01:16 | Text | 1/10 | | 3/10 | Terminated on 01012020-20:00:46 |
| A1 | No | Server1 | 1 | No | 1 | Low (15) | Text 1001 | | 01012020-22:05:36 | Text | 1/10 | | 1/10 | Terminated on 01012020-22:06:06 |

COMMUNICATION OF PARTIAL OR WHOLE DATASETS BASED ON CRITERION SATISFACTION

BACKGROUND

Various example embodiments generally relate to the field of data communications. In particular, some example embodiments relate to transmission of partial information to reduce power consumption. In various data communication applications is desired to minimize energy consumption to enable devices to operate for a long time without access to an external energy source. For example, internet-of-things (IoT) devices may be configured to operate independently, for example to gather information and transmit the information periodically to another device such as for example a server or another IoT device.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments provide a method for power efficient data transmission. This benefit is achieved by the features of the independent claims. Further implementation forms are provided in the dependent claims, the description, and the drawings.

According to an aspect, an apparatus comprises means for receiving, at a transmitter, at least one dataset for transmission to a receiver, wherein the dataset comprises at least one of a plurality of datasets known to the transmitter and the receiver or to be signaled to the receiver; means for determining a first portion of the at least one dataset, wherein a size of the first portion is determined based on at least one of: a battery level indicator, a latency level associated with the dataset, a security level associated with the dataset, a radio condition, or a network load; and means for transmitting the first portion to the receiver.

According to an aspect, a method comprises receiving, at a transmitter, at least one dataset for transmission to a receiver, wherein the dataset comprises at least one of a plurality of datasets known to the transmitter and the receiver or to be signaled to the receiver; determining a first portion of the at least one dataset, wherein a size of the first portion is determined based on at least one of: a battery level indicator, a latency level associated with the dataset, a security level associated with the dataset, a radio condition, or a network load; and transmitting the first portion to the receiver.

According to an aspect, a computer program comprises instructions for causing an apparatus to perform at least the following: receiving, at a transmitter, at least one dataset for transmission to a receiver, wherein the dataset comprises at least one of a plurality of datasets known to the transmitter and the receiver or to be signaled to the receiver; determining a first portion of the at least one dataset, wherein a size of the first portion is determined based on at least one of: a battery level indicator, a latency level associated with the dataset, a security level associated with the dataset, a radio condition, or a network load; and transmitting the first portion to the receiver.

According to an aspect, an apparatus comprises at least one processor and at least one memory including computer program code, the at least one memory and the computer code configured to, with the at least one processor, cause the apparatus to at least perform: receiving, at a transmitter, at least one dataset for transmission to a receiver, wherein the dataset comprises at least one of a plurality of datasets known to the transmitter and the receiver or to be signaled to the receiver; determining a first portion of the at least one dataset, wherein a size of the first portion is determined based on at least one of: a battery level indicator, a latency level associated with the dataset, a security level associated with the dataset, a radio condition, or a network load; and transmitting the first portion to the receiver.

According to an aspect, a non-transitory computer readable medium comprising program instructions for causing an apparatus to perform at least the following receiving, at a transmitter, at least one dataset for transmission to a receiver, wherein the dataset comprises at least one of a plurality of datasets known to the transmitter and the receiver or to be signaled to the receiver; determining a first portion of the at least one dataset, wherein a size of the first portion is determined based on at least one of: a battery level indicator, a latency level associated with the dataset, a security level associated with the dataset, a radio condition, or a network load; and transmitting the first portion to the receiver.

According to an aspect, an apparatus comprises means for receiving, at a receiver, a first portion and/or at least one second portion of a dataset from a transmitter; and means for recognizing the dataset based on comparing the first portion and/or the at least one second portion to a plurality of datasets stored at the receiver.

According to an aspect, a method comprises receiving, at a receiver, a first portion and/or at least one second portion of a dataset from a transmitter; and recognizing the dataset based on comparing the first portion and/or the at least one second portion to a plurality of datasets stored at the receiver.

According to an aspect, a computer program comprises instructions for causing an apparatus to perform at least the following: receiving, at a receiver, a first portion and/or at least one second portion of a dataset from a transmitter; and recognizing the dataset based on comparing the first portion and/or the at least one second portion to a plurality of datasets stored at the receiver.

According to an aspect, an apparatus comprises at least one processor and at least one memory including computer program code, the at least one memory and the computer code configured to, with the at least one processor, cause the apparatus to at least perform: receiving, at a receiver, a first portion and/or at least one second portion of a dataset from a transmitter; and recognizing the dataset based on comparing the first portion and/or the at least one second portion to a plurality of datasets stored at the receiver.

According to an aspect, a non-transitory computer readable medium comprising program instructions for causing an apparatus to perform at least the following: receiving, at a receiver, a first portion and/or at least one second portion of a dataset from a transmitter; and recognizing the dataset based on comparing the first portion and/or the at least one second portion to a plurality of datasets stored at the receiver.

Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 10 illustrates an example of a plurality of datasets, recognition of a dataset, and updating the dataset with a new block at a receiver, according to an example embodiment;

FIG. 11 illustrates an example of definitions for signaling data, according to an example embodiment;

FIG. 15 illustrates an example of a message log stored at an apparatus, according to an example embodiment;

Like references are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

According to an example embodiment, a transmitter may receive at least one dataset for transmission. The dataset may be one of a plurality of datasets known to the transmitter and a receiver. The transmitter may determine a first portion of the dataset. The size of the first portion may be determined based on at least one of: a battery level indicator, for example a charge level of the battery, a latency level associated with the dataset, a security level associated with the dataset, a radio condition, or a network load. The receiver may recognize the dataset based on the first portion and/or at least one second portion transmitted by the transmitter. Furthermore, the transmitter may receive feedback indicating whether the receiver was able to recognize the dataset. Alternatively, absence of the feedback may be interpreted as successful recognition of the dataset, or as a request to transmit further data. Based on the received feedback, of absence thereof, the transmitter may transmit one or more additional portions of the dataset or terminate transmission of the dataset.

Figure 1:
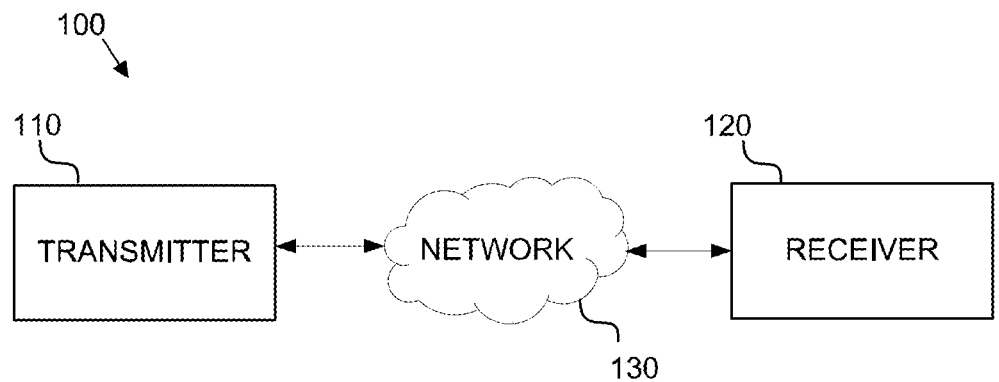
FIG. 1 illustrates an example of data communication between a transmitter and a receiver, according to an example embodiment.

FIG. 1 illustrates an example of data communication system 100 comprising a transmitter 110 and a receiver 120. Even though devices 110 and 120 are referred to as transmitter and receiver, it is understood that devices 110 and 120 may be configured for unidirectional and/or bidirectional connection(s). A device may therefore operate either as a transmitter or receiver or both as a transmitter and receiver.

Transmitter 110 and receiver 120 may be configured to communicate over a network 130. Network 130 may be any suitable wireless or wired communication network, for example a cellular communication network such as a 3G, 4G, or 5G network. In some example embodiments network 130 may comprise a direct radio link between transmitter 110 and receiver 120 such that a radio frequency signal is delivered from an antenna of transmitter 110 to an antenna of receiver 120. It is however appreciated that example embodiments presented herein are not limited to these example networks and embodiments may be applied in any present or future wireless or wired communication networks, for example other type of cellular networks or short-range wireless networks such as Wi-Fi or Bluetooth, or the like. In general, network 130 may comprise any means for enabling delivery of a signal from transmitter 110 to receiver 120.

Transmitter 110 may comprise for example a mobile phone, a smart phone, a tablet computer, a PDA (personal digital assistant), a laptop, a smart watch, an internet of things (IoT) device, base station, remote radio head (RRH), smart antenna, RFID device, WLAN access point, or the like. Examples of IoT devices include, but are not limited to, sensors, tags, wearables, consumer electronics, and smart home appliances. In one example, transmitter 110 may comprise a vehicle such as for example a car, an unmanned vehicle, unmanned autonomous vehicle, camera, bicycle, motorcycle, snowmobile, tractor, train, airplane, relay device, repeater, medical equipment, or a robot. In some example embodiments, such devices may alternatively, or additionally, include functionality of receiver 120.

Receiver 120 may comprise a base station, an access point, a server, or the like. Receiver 120 may alternatively comprise a mobile phone, a smart phone, a tablet computer, a PDA, a laptop, a smart watch, an IoT device, remote radio head (RRH), smart antenna, RFID device, WLAN access point or the like. Communications between transmitter 110 and receiver 120 may be therefore between any combination of handheld/mobile or fixed devices. Receiver 120 may be further coupled to one or more other devices over a wireless or wired connection, or for example via the Internet, to deliver the information received from transmitter 110 to the other device(s) for further processing. The receiver 120 may comprise a vehicle such as for example a car, an unmanned vehicle, unmanned autonomous vehicle, camera, bicycle, motorcycle, snowmobile, tractor, train, airplane, relay device, repeater, medical equipment, or a robot.

Figure 2:
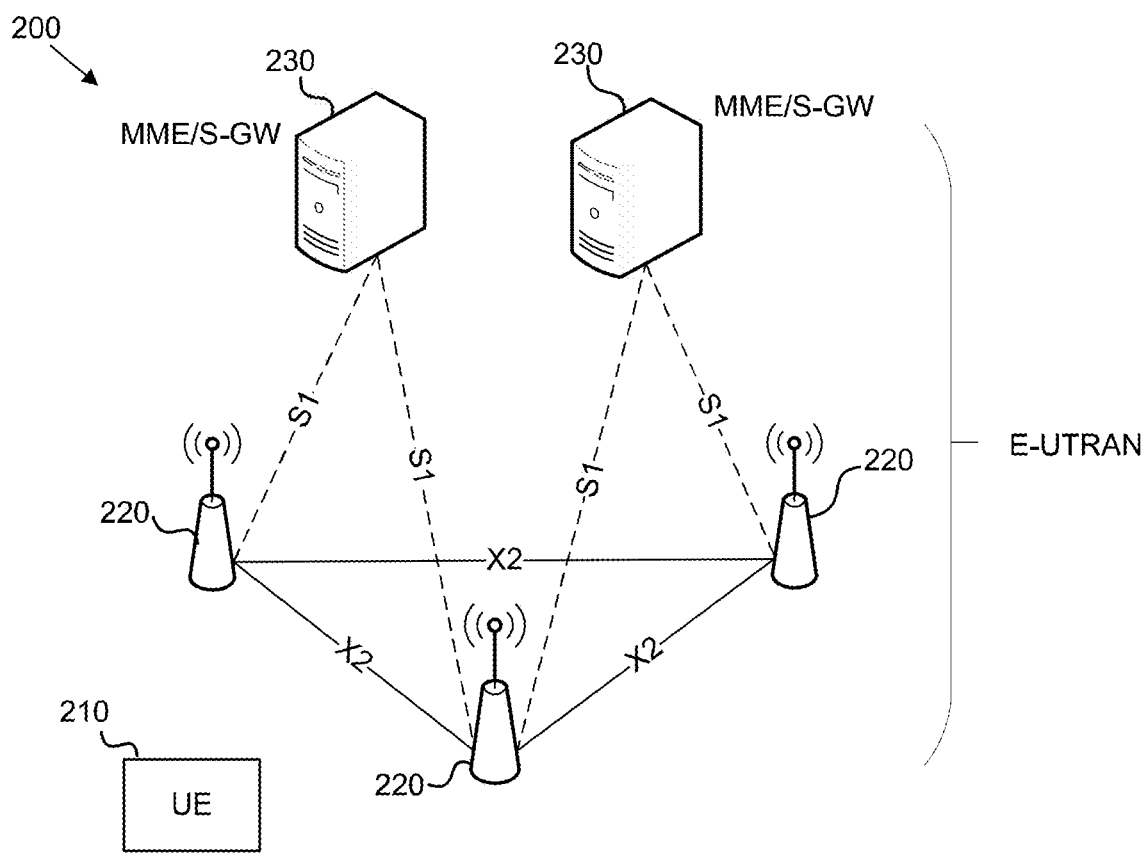
FIG. 2 illustrates an example of a wireless communication network, according to an example embodiment.

FIG. 2 illustrates an example embodiment of a wireless communication network 200, which is provided as an example of network 130. Elements of FIG. 2 may be associated for example with the Evolved Universal Terrestrial Radio Access Network (E-UTRAN). The network 200 may comprise one or more core network elements such as for example Mobility Management Entity (MME) and/or Serving Gateway (S-GW) functions 230 and one or more base stations, represented by eNBs 220. The eNBs are provided as examples of receiver 120.

The network 200 may further comprise one or more client nodes, represented by UE 210, which is provided as an example of transmitter 110. The UE 210 may be also referred to as user node. Alternatively, or additionally, the UE 210 may be also configured to operate as receiver 120. E-UTRAN may comprise a plurality of eNBs 220 that provide E-UTRAN user plane and/or control plane protocol terminations towards UE 210. User plane may be configured to communicate data according to one or more protocol layers including, but not limited to, a packet data convergence protocol (PDCP) layer, a radio link control (RLC) layer, a medium access control (MAC) layer, and a physical (PHY) layer. The control plane may be configured to carry control data according to one or more control protocols, for example a radio resource control (RRC) protocol. The eNBs 220 may communicate with each other over an X2 interface. The eNBs 220 may be further coupled to the Enhanced Packet Core (EPC), for example one or more MME/S-GWs 230, over an S1 interface. The S1 interface may be configured to support a many-to-many relationship between MMEs/S-GWs 230 and eNBs 220. One or more of the eNBs 220 may form an access point (AP) or a base station. UE 210 may be configured to transmit payload data to the eNB(s) 220 as one or more bits or bit groups on the user plane at a particular transmission time. Associated control signaling and configuration information may be carried on the control plane.

MME/S-GWs 230 and eNBs 220 may be generally referred to as network nodes or network devices. Although depicted as a single devices, a network node may not be a stand-alone device, but it may be implemented for example as a distributed computing system coupled to a remote radio head. For example, a cloud radio access network (cRAN) may be applied to split control of wireless functions to optimize performance and cost.

Network 200 may be alternatively configured for example in accordance with the 5th Generation digital cellular communication network, as defined by the 3rd Generation Partnership Project (3GPP). In one example, network 200 may operate according to or similar to one or more functions specified in 3GPP 5G-NR (5G New Radio) standard. For example, the network 200 may comprise one or more $5^{th}$ generation base stations (gNB) instead of eNBs 220. The network can be next generation i.e. $6^{th}$ generation network.

Figure 3:
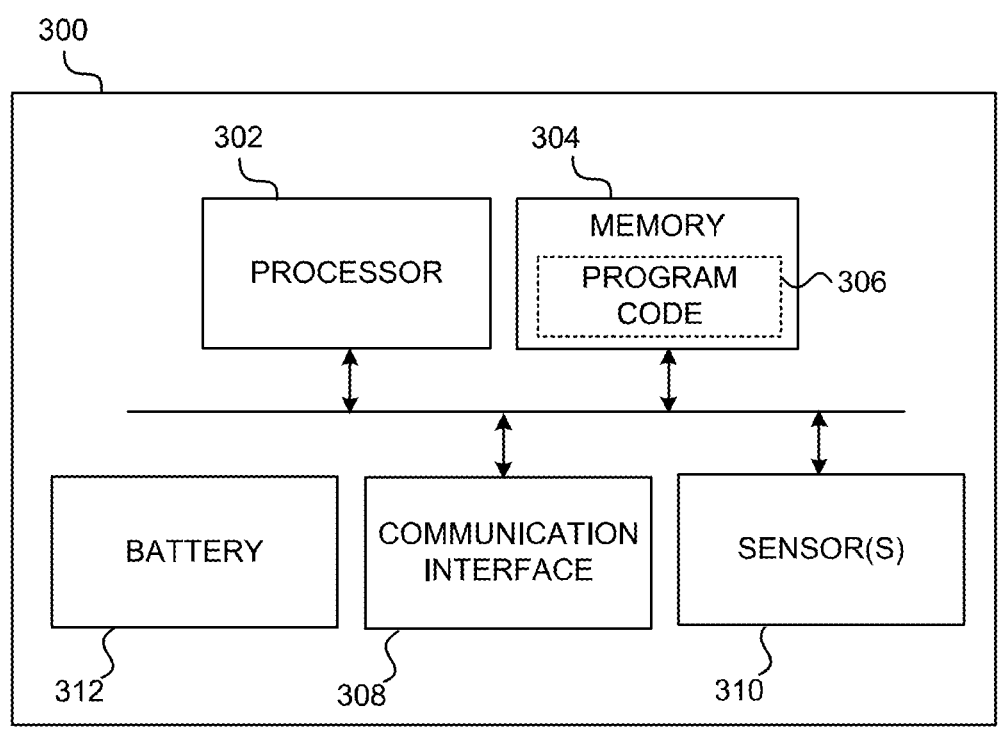
FIG. 3 illustrates an example of an apparatus configured to practice one or more example embodiments.

FIG. 3 illustrates an example of an apparatus 300, for example the transmitter 110 or receiver 120, such as for example UE 210, or a base station such as for example an eNB 220. Apparatus 300 may comprise at least one processor 302. The at least one processor may comprise, for example, one or more of various processing devices, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The apparatus may further comprise at least one memory 304. The memory may be configured to store, computer program code 306, for example operating system software and/or application software. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 300 may further comprise communication interface 308 configured to enable apparatus 300 to transmit and/or receive information, for example signals, messages, information, or data to/from other devices. In one example, apparatus 300 may use communication interface 308 to transmit or receive information and data in accordance with at least one communication protocol. The communication interface 308 may be configured to provide at least one wireless radio connection, such as for example a 3GPP mobile broadband connection (e.g. 3G, 4G, 5G, 6G, 7G, etc.). Alternatively, or additionally, the communication interface 308 may be configured to provide one or more other type of connections, for example a wireless local area network (WLAN) connection such as for example standardized by IEEE 802.11 series or Wi-Fi alliance; a short range wireless network connection such as for example a Bluetooth, NFC (near-field communication), or RFID connection; a local wired connection such as for example a local area network (LAN) connection or a universal serial bus (USB) connection, or the like; or a wired Internet connection. Communication interface 308 may comprise, or be coupled to, at least one antenna or antenna array to transmit and/or receive radio frequency signals. One or more of the various types of connections may be also implemented as separate communication interfaces.

Apparatus 300 may further comprise one or more sensors 310 for retrieving information at the environment of apparatus 300. The sensors 310 may for example comprise at least one temperature sensor, at least one camera, at least one microphone, at least one accelerometer, at least one gyroscope, at least one proximity sensor, or the like. In general, sensors 310 may comprise any device configured to detect information associated with apparatus 300. Information provided by the sensors 310 may be stored in memory 304 and/or transmitted via the communication interface 308.

Apparatus 300 may further comprise, or be configured to be coupled to, at least one battery 312. Battery 312 may be configured to provide power to other components of the apparatus 300. The apparatus 300 may comprise means for determining and providing an indication of a battery level, for example a charge level of the battery 312. The charge level of the battery may be determined for example based on measuring a voltage between battery terminals. The apparatus 300 may further comprise a user interface (not shown), for example to enable manual configuration of the apparatus. Apparatus 300 may further comprise circuitry for detecting location of apparatus 300, such as a GPS (Global Positioning System) receiver, or any other suitable means for determining the location. Location may be determined by apparatus itself, delivered from other apparatus or in combination with apparatus 300 and other apparatus. Location may be determined by proximity detection when apparatus 300 is in predetermined distance or position compared to other corresponding apparatus or any other detection point capable to communicate with apparatus 300.

When the apparatus is configured to implement some functionality, some component and/or components of the apparatus, such as for example the at least one processor and/or the memory, may be configured to implement this functionality. Furthermore, when the at least one processor is configured to implement some functionality, this functionality may be implemented using program code 306 comprised, for example, in the memory 304. Although apparatus 300 is illustrated as a single device it is appreciated that, wherever applicable, functions of apparatus 300 may be distributed into a plurality of devices.

The functionality described herein may be performed, at least in part, by one or more computer program product components such as software components. According to an embodiment, the apparatus comprises a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (CPUs).

The apparatus comprises means for performing at least one method described herein. In one example, the means comprises the at least one processor, the at least one memory including program code configured to, when executed by the at least one processor, cause the apparatus to perform the method.

Figure 4:
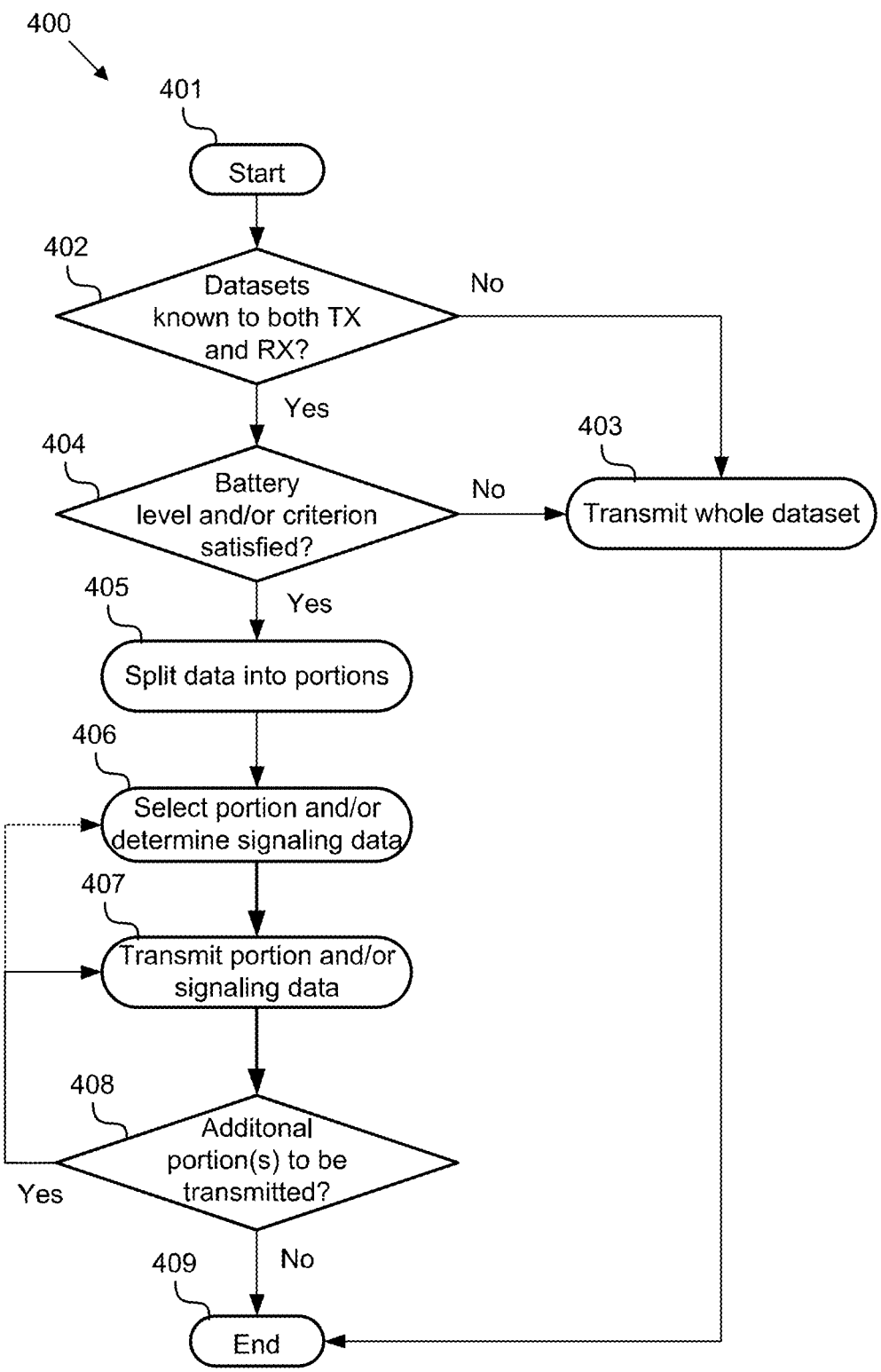
FIG. 4 illustrates an example of a method for partial data transmission, according to an example embodiment.

FIG. 4 illustrates an example of a method 400 for partial data transmission, according to an example embodiment. The method may be started at 401, for example in response to receiving at least one dataset for transmission.

At 402, the transmitter 110 may determine whether both the transmitter 110 (TX) and the receiver 120 (RX) are aware of a plurality of datasets from which at least one dataset is to be communicated to the receiver 120. If the plurality if datasets are not known to the transmitter 110 and the receiver 120, the plurality of datasets may be signaled to the receiver 120, before or after transmission of a first portion of the dataset. For example, the plurality of datasets may comprise a known set of identifiers of a plurality of products, for example serial numbers of the products. The transmitter 110 and the receiver 120 may be preconfigured with the plurality of datasets or the information may be exchanged between the transmitter 110 and the receiver 120. For example, the transmitter 110 may initially transmit the plurality of datasets to the receiver 120. The receiver 120 may receive the plurality of datasets from the transmitter 110. A task of the transmitter 110 may be then to indicate one or more datasets of the plurality of datasets to the receiver 120. For example, an IoT device may be configured to monitor a production line and to report when a product has passed a particular production line phase. The serial numbers of the products may be known and the IoT device may be configured to indicate which of the known products it has detected at a particular time.

At 403, the transmitter 110 may determine to transmit the at least one dataset to the receiver 120, for example in response to determining that the receiver 120 is not aware of the plurality of datasets. Hence, the transmitter 100 may transmit the whole dataset to the receiver 120. The transmitter may further transmit signaling data indicating that the dataset is a whole dataset and/or that the dataset is an unknown dataset.

At 404, the transmitter 110 may determine whether at least one battery level criterion and/or other criterion is satisfied. Determining whether the at least one criterion is satisfied may be based on at least one of: a battery level indicator, a latency level associated with the dataset, a security level associated with the dataset, a radio link condition, or a network load. The battery level indicator may comprise at least one of: a charge level of the battery, an estimated battery usage before a charging opportunity, an estimated battery usage for the transmission of the dataset, or an estimated battery usage under current operating conditions of the transmitter 110. In general, the transmitter 110 may determine whether it has sufficient resources for transmitting the whole dataset. There can be also prioritization when battery level does not allow to transmit all datasets or dataset parts (data portion) waiting for transmission, there can be prioritization between datasets, i.e., some dataset may have higher priority (more relevant to send first) than another dataset and may be therefore transmitted first. For example, the transmitter 110 may determine a size of the first portion based on the battery level indicator, the latency level, the security level, the radio condition, or the network load. The transmitter may select the first portion from the dataset based on a priority order of different portions of the dataset.

An estimated battery usage before a charging opportunity may comprise an estimate of a change in the charge level of the battery 312 or an estimate of a power consumption until the next charging opportunity. Estimated time until the charging opportunity may be determined based on charging history, current location, and/or location history of the transmitter 110, and/or battery consumption in current radio conditions. For example, if more transmission power is needed in weak radio conditions, the transmitter 110 may determine the estimated battery usage to be higher. In addition, when during some part of the day there is a rush or high load in the network, the transmission can be done when no rush or less load is expected, if the dataset can wait handling and transmission. For example, an IoT device may know the time for next charging, or change of battery, based on earlier behavior, for example a recurring charging schedule. Also, the IoT device may determine based on its geographical position that a charging opportunity will be soon available and operate accordingly. For example, availability of charging opportunity may be determined based on current location, for example detecting the current location to be near a predetermined location such as for example home, office, cafeteria, or the like. The IoT device may also get signaling information indicating when (e.g. a time instant) its battery is to be changed or charged. For example, a serviceman or any device capable to communicate with IoT device can send or signal information to the IoT device indicating that the battery is to be changed 21.2.2020 at 10 PM. Alternatively, the IoT device can send a signaling part within the data portion indicating that battery charging or changing is requested. According to another example, the IoT device may typically operate at a fixed place. However, when the IoT device is moving, the IoT device may determine that its battery is going to charged or changed. The movement may be interpreted as an indication of a charging opportunity being available soon. The IoT device may also learn from its earlier charging behavior with respect to geographical position. Alternatively, the estimated time to the charging opportunity may be determined based on a predetermined charging time instant or a plurality of periodical charging time instants. For example, the user of the IoT device may be enabled to configure a charging schedule comprising indications of one or more charging times. If the battery level is below a threshold or there's no charging opportunity expected, the transmitter 110 may determine not to transmit the whole dataset. When the IoT device is in solar charging (e.g. using solar panel), it can take weather conditions into account in partial transmission. When there is sunny weather and battery charging goes well, the data portion size from dataset to be transmitted can be adjusted accordingly. The IoT device may also take weather forecast into account for example, an estimate of a charging opportunity may be determined based on a forecast indicating a sunny weather. Hence, future weather forecasts may affect the data portion size. Weather forecasts may be signaled to the IoT device, for example using weather signaling bits as follows: For example, three bits: 000, 001, 010, 011, 100, 101, 110, 111 may give indicate forecasts for four days. MSB=0 may indicate "no sun". MSB=1 may indicate "sun". LSBs=00 may indicate a day, for example "tomorrow". LSBs=01 may indicate another day, for example "the day after tomorrow" Alternatively, MSB=0 may indicate "tomorrow", MSB=1 may indicate "the day after tomorrow". LSBs=00 may indicate "cloudy", LSBs=01 may indicate "half cloudy", LSBs=10 may indicate "75% sunny", and/or LSBs=11 may indicate "fully sunny". Therefore, the IoT device may estimate future charging opportunity based on weather and adjust data portion size to be transmitted accordingly. Other parameters which may reflect to adjustments may be for example, day-time or night-time lengths and temperature.

The estimate of battery usage for the transmission of the dataset may be determined based on size of the dataset and/or characteristics of the current radio link, for example the required transmission power. If transmission of the whole dataset is determined to cause excessive battery usage, the transmitter 110 may determine not to transmit the whole dataset. In this case also, prioritization for transmission may be applied, for example the most important dataset may be taken under handling and transmission first.

Furthermore, the battery level indicator may comprise estimated battery usage under current operating conditions of the apparatus. The operating conditions may or may not relate to transmission of the dataset. For example, if there are a predetermined number of applications simultaneously running and/or current power consumption of the transmitter 110 exceeds a threshold, the transmitter 110 may determine not to transmit the whole dataset. Furthermore, if the heat of the transmitter 110 exceeds a threshold, the transmitter 110 may determine not to transmit the whole dataset. The heat may be one criterion when selecting the size of the first and/or the at least one second portion from the dataset.

However, if any the battery level related criteria are not satisfied, for example battery level is above a threshold and/or current power consumption is below a threshold, the transmitter 110 may determine to transmit the whole dataset.

Alternatively, or additionally, transmitter 110 may use one or more other criteria for determining whether to transmit the whole dataset of portions(s) of the dataset. According to an example embodiment, the transmitter 110 may determine to transmit the dataset in response to determining that an estimate of a required capacity for transmitting the first portion and at least one second portion exceeds an estimate of a required capacity for transmitting the dataset. For example, the transmitter 110 may estimate a required transmission capacity for partial transmission of the dataset to exceed the capacity needed for transmitting the whole dataset. This may be for example due to additional signaling load associated with transmitting the dataset in multiple portions. This may also be due to additional power consumption when switching the transmitter from an OFF state to an ON state again for the further transmission(s). This may also be due to additional transmitter and/or transmitter receiver part ON state time between transmissions, for example when waiting whether a next portion needs to be transmitted.

At 403, the transmitter 110 may transmit the whole dataset.

Figure 5:
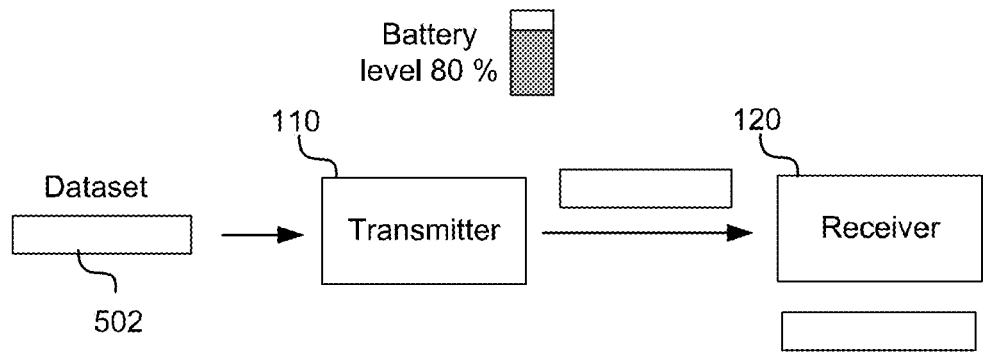
FIG. 5 illustrates an example of transmission of a whole dataset, according to an example embodiment.

FIG. 5 illustrates an example of transmission of a whole dataset, according to an example embodiment. The transmitter 110 may receive a dataset 502 for transmission. Based on the battery level indicator, for example the charge level of the battery being at 80%, the transmitter 110 may determine to transmit the whole dataset 110 to receiver 120. Since the whole dataset is transmitted, the receiver 120 is able to recognize the received dataset from the plurality of datasets known to receiver 120. This enables the dataset to be quickly communicated to the receiver, when the charge level of the battery is above a threshold.

Referring back to FIG. 4, at 405 the transmitter may split the dataset into a plurality of portions, for example blocks. Splitting the data into the portions may be in response to determining that the at least one battery level criterion is satisfied.

According to an example embodiment, the transmitter 110 may determine a first portion of the at least one dataset. Size of the first portion may be determined based on the at least one battery level indicator. For example, the size of the first portion may be proportional to the charge level of the battery, inversely proportional to the estimated time to the charging opportunity, or proportional to an amount of data to be transmitted or an estimate of the amount of data to be transmitted. This enables the transmitter to reduce power consumption since the receiver 120 may be able to recognize the dataset based on the first portion. The estimate of the amount of data to be transmitted may be determined for example based an amount of data in a transmission buffer of the transmitter 110 or an amount of data scheduled for or expected at a particular time. Proportional may refer to obtaining the size of the first portion based on any suitable increasing function of the charge level of the battery. The function may be a linear or a non-linear function. In a similar fashion, inversely proportional may refer to obtaining the size of the first portion based on any suitable decreasing function of the time to the charging opportunity. In addition, the size of the first portion may be determined based on latency requirements of the dataset, for example a latency level associated with the dataset. Particular dataset may have tighter latency requirement than other dataset(s). If latency requirement is high meaning shorter transmission time, the dataset may be split into shorter size portions than another dataset that has lower latency requirement. When portion size is smaller, the transmission time is shorter and hence the dataset awareness is achieved sooner. If there are a plurality of high latency requirement datasets, there is a possibility to get thru awareness from several datasets using same amount of time, compared to using longer portions of the datasets. This may be useful for example in critical machine communication, for example communication that belongs to so called URLLC (Ultra Reliable Low Latency Communication) category, which may require instant actions. The size of the data portion(s) may be determined based on the following rule: tighter latency requirement may cause a shorter portion of the dataset to be selected, and vice versa. This may be useful for autonomic vehicle traffic, for example. In addition, splitting a dataset to smaller portions may be useful also for an ultra low cost massive machine communication category, where battery life requirement is long, such as for example 10 years. The size of the data portion(s) may be determined based on the following rule: longer battery live requirement may cause a shorter portion of the dataset to be selected, and vice versa.

The size of the first portion may be for example determined based on a plurality of battery level thresholds mapped to a corresponding plurality of data portion sizes. For example, when the charge level of the battery is 20%, the transmitter 110 may determine to divide the dataset into five portions. Furthermore, when charge level of the battery is 40% or 60%, the transmitter 110 may determine to divide the dataset into four or three portions, respectively. The portions may be of equal size. The portions may have also different sizes, for example dynamically changed between transmissions when optimizing total bit size to be transmitted compared to dataset size. At or above 80%, the transmitter may determine to transmit the whole dataset, as illustrated in FIG. 5. In another example, battery level thresholds 100%, 75%, 50%, 25%, may be mapped to whole dataset, ½ of the dataset size, ¼ of the dataset size, and ⅛ of the dataset size, respectively. Battery levels below 25% may be mapped to 1/16 of the dataset size.

At 406, the transmitter 110 may select the first portion of the dataset for transmission and/or determine signaling data to be transmitted along with the first portion of the dataset. Selecting the first portion may comprise selecting size of the first portion and location of the first portion within the dataset. The first portion of the dataset may be for example selected starting from a particular direction, for example left, right, LSB (least significant bit), or MSB (most significant bit). However, the portion may be also selected based on data content surrounding the selected first portion, as will be further discussed in relation to FIG. 11 and FIG. 12. The first portion may be determined such that the first portion is unique within the plurality of datasets. This enables the receiver 120 to recognize the dataset based on the first portion. Alternatively, the first portion may be determined such that the first portion is unique within corresponding portions of the plurality of datasets, as will be further discussed in relation to FIG. 9. It is noted that even if some example embodiments have been described using bit strings or hexadecimal symbol sequences as examples, the datasets can take various other formats such as for example two-dimensional matrices or multi-dimensional tensors. For example, in case of volumetric video or image content, the first portion may comprise a sub-volume inside an object included in the volumetric content.

At 406, the transmitter 110 may further determine signaling data. The signaling data may in general comprise information that assists the receiver 120 in recognizing the received dataset. For example, the signaling data may comprise an indication of a location of the first portion in the dataset. The indication of the location may comprise an index or an order number of the first portion within the dataset. The indication of the location may further comprise a total number of portions in the dataset and/or size(s) of the portions.

At 407, the transmitter 110 may transmit the first portion to the receiver 120. The transmitter 110 may also transmit the signaling data to the receiver 120. For example, the transmitter 110 may transmit the indication of the location of the first portion in the dataset.

Figure 6:
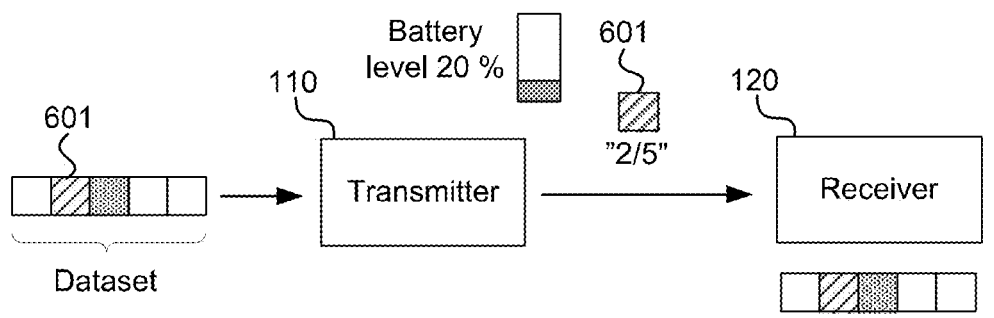
FIG. 6 illustrates an example of transmission of a portion of a dataset, according to an example embodiment.

FIG. 6 illustrates an example of transmission of a portion of a dataset, according to an example embodiment. Based on the at least one battery level indicator, for example the charge level of the battery being at 20%, the transmitter 110 may divide the dataset into five portions. Furthermore, the transmitter 110 may transmit a first portion 601. The transmitter 110 may further transmit an index "2" of the first portion 601 within the dataset. Alternatively, the transmitter 110 may transmit an indication of the index and the total number of portions in the dataset "2/5", as illustrated in FIG. 6. If the first portion 601 is unique within the plurality of datasets or within the indicated locations of the plurality of datasets, receiver 120 may recognize the dataset based on the first portion and the transmitter 110 may terminate transmission of the dataset. For example, the transmitter 110 may refrain from transmitting the four other portions of the dataset.

Referring back to FIG. 4, at 408 the transmitter 110 may determine whether additional portions are to be transmitted. The transmitter 110 may for example receive feedback from the receiver 120. The transmitter 110 may be further configured to perform at least one operation based on the feedback, or absence of the feedback. The at least one operation may for example comprise transmitting at least one second portion of the dataset or terminating transmission of the dataset.

The feedback may comprise a request to transmit at least one second portion of the dataset. The receiver 120 may be configured to receive the first portion of the dataset and recognize the dataset based on comparing the first portion to the plurality of datasets. However, it may not be possible to recognize the dataset based on the first portion. The receiver 120 may therefore transmit the request to transmit at least one second portion of the dataset, for example in response to determining that the first portion is not unique within the plurality of datasets. The receiver 120 may for example determine that the dataset can not be distinguished from the plurality of known datasets based on the first portion and that more data is needed for recognizing the dataset. The first portion may be for example corrupted on radio transmission path and therefore it may not be possible to identify or decode it at the receiver side. Subsequent second portion and possible further portions may make dataset as known to the receiver. In response to receiving the request, the transmitter 110 may determine to transmit at least one second portion of the dataset. For example, the transmitter may move back to operations 406 and/or 407 to select and/or transmit at least one second portion of the dataset, optionally along with associated signaling data. In addition, it is possible to use transmit diversity when the transmitter 110 has a plurality of antennas. For example, the first portion may be transmitted via antenna 1 (or beam 1). The second portion may be transmitted via antenna 2 (or beam 2). If the antenna 1 transmission does not reach the receiver 120 but the antenna 2 transmission does reach the receiver 120, the dataset may be recognized from the second portion. The certain antenna (or beam) may have individual identification, for example the antenna 1 (or beam 1) may have ID=1 and the antenna 2 (or beam 2) may have ID=2. There may be a rule known both to transmitter 110 and the receiver 120, which may indicate that when data portion 1 comes from the antenna 1 or beam 1 (ID=1) the data portion 1 belongs to dataset 1. And, when data portion 1 comes from the antenna 2 or beam 2 (ID=2) the data portion belongs to dataset 2. It is also possible to make differentiation between datasets using different antennas or beams. Note that amount of antennas or beams may follow indexing; Antenna 1 (or beam 1), Antenna 2 (or beam 2), . . . , Antenna N (or beam N). In addition, data portions may be transmitted using spatial multiplexing i.e. MIMO principles.

Alternatively, the feedback may comprise an indication of a successful recognition of the dataset. The receiver 120 may transmit the indication of the successful recognition of the dataset, for example in response to determining that the first portion is unique within the plurality of datasets. The receiver 120 may determine that the dataset can be recognized and more data is not needed. In response to receiving the indication of the successful recognition of the dataset, the transmitter 110 may terminate transmission of the dataset. For example, the transmitter may refrain from transmitting further portions of the dataset.

Alternatively, the receiver 120 may be configured to refrain from transmitting the feedback, either in response to determining that the first portion is unique within the plurality of datasets or in response to determining that the first portion is not unique within the plurality of datasets. This enables to reduce the amount of data traffic. The transmitter 110a may be for example configured to interpret absence of the feedback as a request to transmit at least one second portion of the dataset or as an indication of the successful recognition of the dataset. The signaling data may comprise an indication of a requested feedback configuration for the receiver 120. For example, the transmitter 110 may request the receiver not to transmit feedback if the dataset can not be recognized. Alternatively, the transmitter 110 may request the receiver to transmit feedback, if the dataset can not be recognized.

According to an example embodiment, the feedback may comprise a request to decrease the size of the data portions. This enables the receiver 120 to control its power consumption. The receiver 120 may transmit the request for smaller data portions, for example in response to at least one battery level indicator similar to that of transmitter 110. In addition, the request may be applied to decrease the size of data portions in the case that receiver identifies tighter latency requirement for a dataset or a plurality of datasets.

At 408, the transmitter may alternatively determine whether additional portion(s) are to be transmitted regardless of the feedback, or absence thereof. According to an example embodiment, the transmitter 110 may determine to transmit the at least one second portion, in addition to the first portion, for example in response to determining that the first portion is not unique within the plurality of datasets and that a combination of the first portion and the at least one second portion is unique within the plurality of datasets. This enables to ensure that receiver 120 has sufficient amount of data for recognizing the dataset. This also enables to avoid or reduce transmission of the feedback.

The transmitter 110 may move from operation 408 directly to operation 407, for example if the at least one second portion and/or associated signaling date were already determined at 406 before transmission of the first portion. Alternatively, the transmitter 110 may move to operation 406 to determine the at least one second portion and/or the associated signaling data. At 406 and 407, similar operations may be performed for the at least one second portion. The transmitter 110 may iterate operations 406 and/or 407 and 408 until the transmitter 110 determines that the receiver 120 has successfully recognized the dataset, for example based on the feedback or absence of the feedback.

According to another example embodiment, the transmitter 110 may determine whether to transmit the whole dataset or apply partial data transmission after splitting the data into the portions. This may be based on for example an estimated battery usage for transmission of the first portion at current radio conditions and/or at current network load level. The transmitter 110 may for example determine that under current radio conditions and/or network load level the transmission of the first portions would cause battery usage to exceed a threshold. In response, the transmitter 110 may determine to transmit the whole dataset instead of the first portion.

At 409, the method may be ended, for example in response to determining at 408 that no further portions are to be transmitted or in response transmission of the whole dataset at 403.

Figure 7:
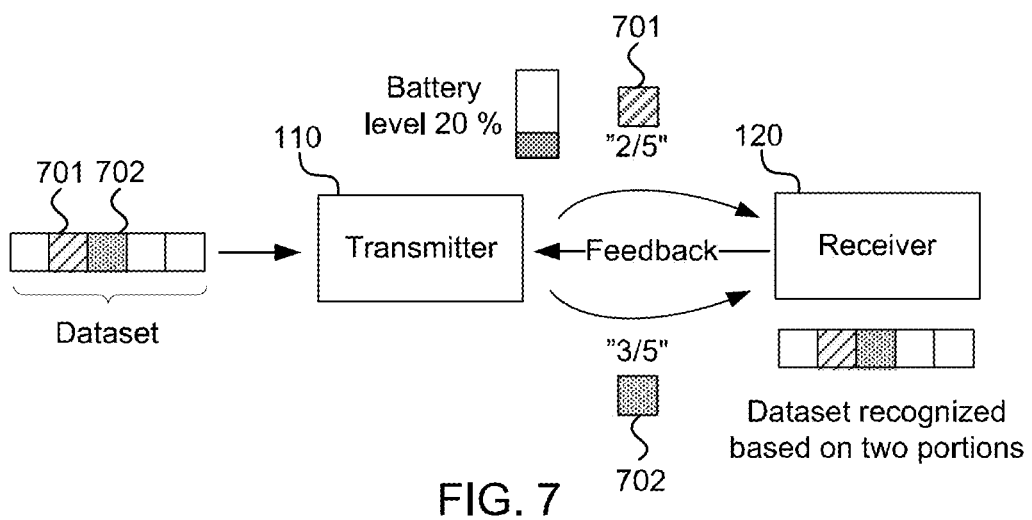
FIG. 7 illustrates an example of transmission of an additional portion of a dataset based on feedback from a receiver, according to an example embodiment.

FIG. 7 illustrates an example of transmission of an additional portion of a dataset based on feedback from a receiver, according to an example embodiment. Based on the at least one battery level indicator, for example the charge level of the battery being at 20%, the transmitter 110 may divide the dataset into five portions, similar to FIG. 6. Furthermore, the transmitter 110 may transmit a first portion 701. The transmitter 110 may further transmit an index "2" of the first portion 701 within the dataset. Alternatively, the transmitter 110 may transmit an indication of the index and the total number of portions in the dataset "2/5", as illustrated in FIG. 7. If the first portion 701 is not unique within the plurality of datasets or within the indicated locations of the plurality of datasets, receiver 120 can not recognize the dataset based on the first portion. The receiver 120 may provide feedback to transmitter 110 to request another portion of the dataset to be transmitted. In response to receiving the feedback, the transmitter may transmit a second portion 702 of the dataset. The transmitter 110 may further transmit an index "3" of the second portion 702 within the dataset or an indication of the index and the total number of portions in the dataset "3/5", as illustrated in FIG. 7. According to an example embodiment, the transmitter may indicate the index and the total number of portions for the first portion and indicate the index of the second portion without the total number of portions for the second portion. This enables to reduce the amount of signaling data.

In addition, there can be an option that after first portion "2/5" there may be a predetermined rule (known both transmitter and receiver) that the next portion, e.g. the second portion, to be transmitted is situated at index i+n or index i−m in relation to the first portion, for example "2/5". Index i may indicate place of the first portion. In one example, n=1, 2, 3 and m=1. Values for n and m may depend on total amount of portions in the dataset and used value for n or m may depend on how it is agreed in the predetermined rule. When determining that first portion "2/5" didn't make a difference between two datasets, the second portion may follow the rule i+1 and the receiver 120 may determine that the second portion is "3/5".

According to an example embodiment, transmission of the feedback may be based on a priority level of the dataset. The priority level may comprise a binary indication of priority or no priority. Alternatively, the priority may comprise a plurality of priority levels such as for example a priority order among the plurality of datasets. The transmitter may request the receiver 120 to operate according to a particular feedback configuration based on the priority level of the dataset subject to transmission. For example, if priority level of a dataset is above or at a threshold, the receiver 120 may be requested to transmit the feedback. The feedback may comprise an indication that more data is requested and/or that enough data has been already transmitted. For lower priority datasets the transmitter may not request the receiver to provide the feedback. At the receiver 120, a dataset with a lower priority may be derived based on one or more successfully received higher or lower prioritized datasets, if the datasets are related to each other.

According to an example embodiment, the receiver 120 may determine whether to transmit the feedback based on the battery level indicator at receiver 120. For example, the receiver 120 may be configured to transmit the feedback if the charge level of its battery is above a threshold. Transmission of the feedback may therefore be dependent on the battery level, optionally in combination with the priority of the dataset. Transmission of the feedback may be further dependent on the battery level of the transmitter 110. The receiver 120 may determine the battery level of the transmitter 110 for example based on the size of the data portion(s) received. If the size is lower than a threshold, the receiver 120 may determine not to transmit feedback, for example to avoid consuming power at the transmitter 110 for receiving the feedback. If the receiver 120 was not able to recognize the dataset based on the received portion(s), the receiver 120 may determine to postpone transmission of the feedback, if the battery level of the receiver 120 or the transmitter 110 is determined to be low or the current radio conditions would cause excessive power consumption with respect to the current battery level(s). Transmission of the feedback may be postponed until next charging availability or until the radio conditions are better. In this example embodiment, the successful reception of the dataset may be acknowledged by transmitting feedback including a corresponding indication.

According to an example embodiment, the transmitter 110 or the receiver 120 may derive and provide maintenance related information based on the partial transmission process. For example, if the transmitter 110 estimates the battery level of the receiver 120 to be low, for example based on absence of the indication that the dataset was successfully received, the transmitter 110 may transmit an indication of the low battery level to a server, or other entity, for example in order to request a serviceman to check the battery level of the receiver 120. Alternatively, or additionally, if the receiver 120 estimates the battery level of transmitter 110 to be low, the receiver 120 may transmit an indication of the low battery level in a similar fashion. The receiver 120 may determine or estimate the battery level of transmitter 110 to be low based on size of received data portion(s), for example if the data portion size decreases or has decreased or changes between the received data portions. For example, if the first data portion is 20% of the dataset and after feedback a second portion is 10% of the dataset, it may indicate the reduction of power level of transmitter 110.

As discussed above, a dataset may be divided into a plurality of portions. In one example, a hexadecimal dataset representing a serial number of a product may be divided into ten portions. Each product may be associated with an individual serial number. For example, Product 1 may have a serial number divided into following portions: "0FEC1AB", "1111111", "3ACD101", "FFEF105", "CABFEFD", "0024678", "7ABCDEF", "FEDCBA0", "010101A", and "ABBAFFC. In this example, size of each portion is 7 hexadecimal symbols. For example, an IoT device may be configured to monitor passing products on a production line. The IoT device may send portion "ABBAFFC" to a server. The server may receive the portion "ABBAFFC" from the IoT device and compare the received portion "ABBAFFC" and the first data part "ABBAFFC" in its memory. The server may find a match with Product 1. In this example, no further data needs to be transmitted because the server is able to recognize the hexadecimal dataset based on the received portion "ABBAFFC". However, if some other product has similar serial number portion "ABBAFFC", the serer may request the IoT device to provide another portion of the dataset in order to find a differentiating portion. In addition, the IoT device may monitor passing traffic on a roadway and recognize vehicle names and their colors. In this example, the partial data may comprise a car logo and a color pixel. Another option may be a part of side picture from front and rear end, from which the accurate car name and model may be derived.

The production line may be equipped with a plurality of IoT devices, each corresponding to a particular phase of the production line. The server may determine the production line phase associated with the recognized dataset based on the identity of the IoT device. An identifier of the IoT device, or in general transmitter 110, may be for example included in the signaling data.

A benefit of partial data transmission is that it may ensure secure transmission of the dataset because only the first portion may need to be transmitted and the intended receiver may detect the dataset based on the first portion. If a third party (e.g. an illegal user) sniffs the first portion from radio path, the third party can not recognize the dataset due to lack of awareness of the whole dataset. Only the intended (legal) user who is aware of the whole dataset may recognize the dataset based on the first portion. Therefore, the example embodiments may be also used to improve security. For example, the size of the first and/or at least one second portion may be determined based on a security level associated with the dataset. A smaller size may be selected for datasets associated with a higher security level. A higher size may be allowed for datasets associated with a lower security level.

Figure 8:
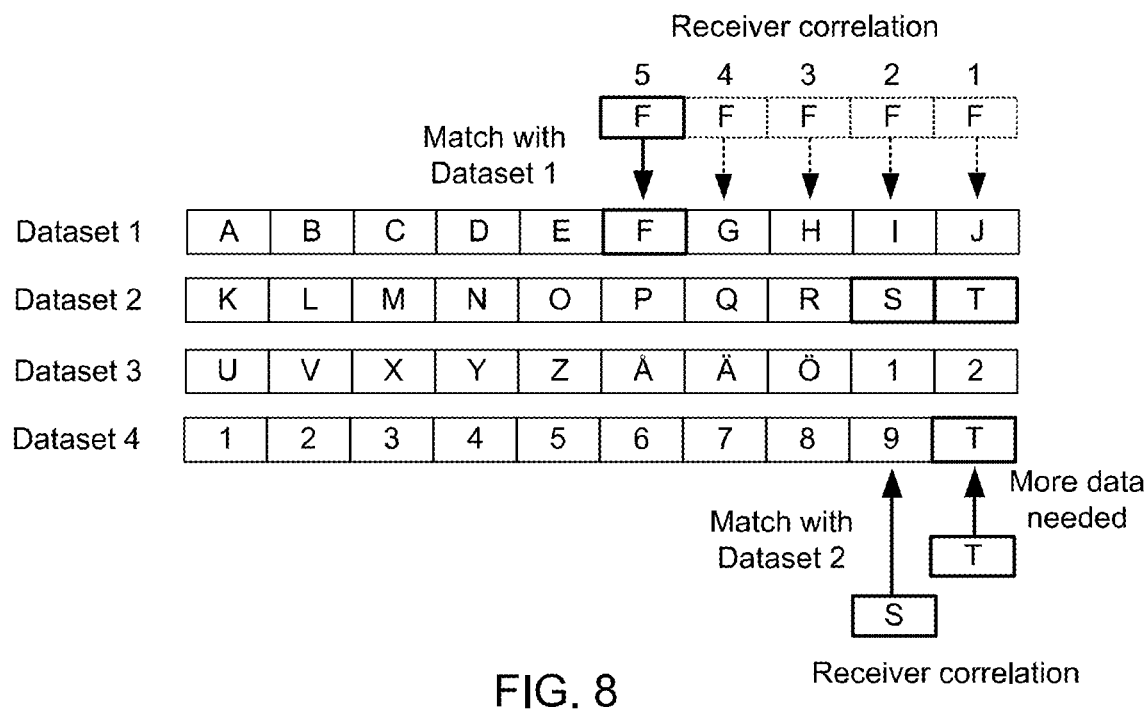
FIG. 8 illustrates an example of a plurality of datasets and recognition of a dataset at a receiver, according to an example embodiment.

FIG. 8 illustrates an example of a plurality of datasets and recognition of a dataset at a receiver, according to an example embodiment. FIG. 8 illustrates four datasets "ABCDEFGHIJ", "KLMNOPQRST", "UVXYZÅÄÖ12", and "123456789T". Each dataset has been divided into ten portions, each portion being represented by a letter or digit.

According to a first example, the transmitter 110 may send "F" as the first portion. In response to receiving the first portion "F", the receiver 120 may perform receiver correlation. For example, the receiver 120 may start to correlate the first portion "F" with respect to each dataset, for example from the right with respect to portions 1 to 5 of each dataset. The receiver 120 may not find a match with any datasets until the fifth portion of Dataset 1. After detecting a match with Dataset 1, the receiver 120 may determine whether there are other matches. If not, the receiver 120 may recognize the Dataset 1 based on the first portion "F". In this example, the required data transmission capacity is $\frac{1}{10}$ of the capacity required for transmitting the whole dataset.

According to a second example, the transmitter may send "T" as the first portion. In response to receiving the first portion "T", the receiver 120 may perform receiver correlation. For example, the receiver 120 may start to correlate the first portion "T" with respect to each dataset from the right. The receiver 120 may find matches with the first portions of Datasets 2 and 4. The receiver 120 may further determine that the first portion "T" is not unique within the datasets and request the transmitter 110 to transmit a second portion. In response, the receiver 120 may determine that more data is needed. Subsequently, the transmitter 110 may transmit "S" as the second portion. In response to receiving the second portion "S", the receiver 120 may perform another receiver correlation. For example, the receiver 120 may start to correlate the second portion "S" with respect to each dataset or a subset of datasets, for example the subset of Datasets 2 and 4, which the receiver 120 was not able to distinguish based on the first portion. The receiver 120 may find a match with the second portion of Dataset 2. After detecting a match with Dataset 2, the receiver 120 may determine whether there are other matches for "S" in the datasets or the subset of datasets. If not, the receiver 120 may recognize the Dataset 2 based on the second portion "S". In this example, the required data transmission capacity is ⅕ of the capacity required for transmitting the whole dataset.

Figure 9:
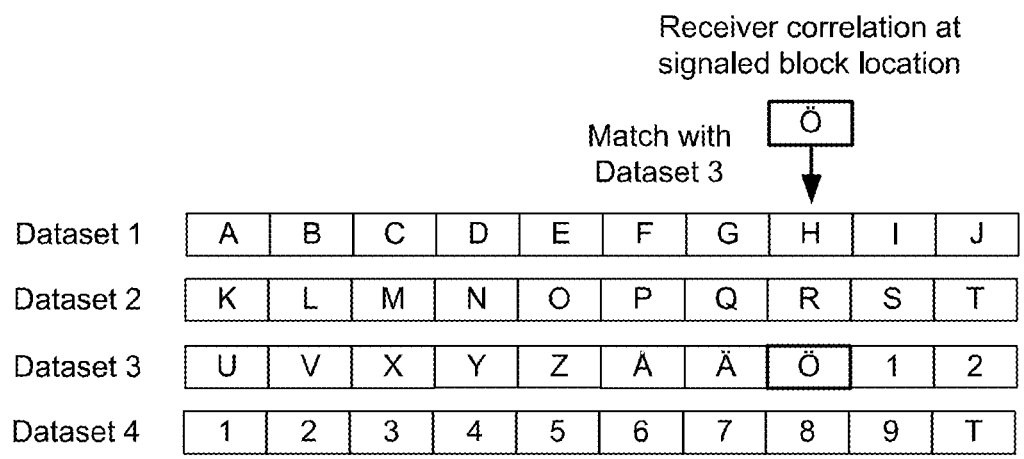
FIG. 9 illustrates an example of a plurality of datasets and recognition of a dataset at a receiver based on a signaled block location, according to an example embodiment.

FIG. 9 illustrates an example of a plurality of datasets and recognition of a dataset at a receiver based on a signaled block location, according to an example embodiment. In this example, the transmitter 110 may transmit "Ö" as the first portion. The transmitter may further transmit an indication of the index "3" or the index and the total number of portions "3/10", which may be also called blocks. In response to receiving the first portion and the signaled location, the receiver may perform receiver correlation at the signaled block location. For example, the receiver 120 may correlate the first portion "Ö" with the datasets at the signaled location "3" or "3/10". The receiver 120 may not find correlation with the third blocks "H", "R", and "8" of the Datasets 1, 2, and 4, but detects a match with Dataset 3. In this example, the required data transmission capacity is slightly above ⅒ of the capacity required for transmitting the whole dataset, depending on the amount of signaling data with respect to the size of the whole dataset.

FIG. 10 illustrates an example of a plurality of datasets, recognition of a dataset, and updating the dataset with a new block at a receiver, according to an example embodiment. From time to time the transmitter 110 may receive data, which is associated with one of the plurality of datasets, but which is not initially included in the dataset. However, example embodiments provide an efficient method for updating at least one of the plurality of datasets based on the partial data transmission. The transmitter may transmit as the first portion a new portion "NEW", which is not initially associated with Dataset 2, or any other dataset. Since the receiver 120 is not aware of this portion, it may not find a match with any of the Datasets 1 to 4. The receiver may however store the first portion "NEW". The receiver 120 may request another portion to be transmitted, or, refrain from transmitting feedback in order to keep the transmitter 110 transmitting further portions. The transmitter 110 may further transmit an indication that the first portion "NEW" is a new portion not initially associated with the dataset. This enables the receiver 120 to determine that further portion(s) are needed without trying to correlate the first portion "NEW" with the datasets, which reduces power consumption and required processing power at the receiver and also enables the receiver to provide the feedback faster.

According to an example embodiment, a plurality of servers, which may be for example located around the world, may share their information with each other about identified new datasets such that the new datasets are available at each server when receiving data portions. For example, in response to identifying a new dataset, Server 1 may send it to Server 2, Server 3, . . . , and/or Server N, which may update their datasets accordingly. Servers may be connected to each other via Internet, for example. This approach reduces transmissions of whole datasets from IoT devices and accelerates dataset collection process at server side. Servers may be located at various countries.

In response to feedback from receiver 120, or absence of the feedback, the transmitter 110 may transmit a second portion "K" to the receiver 120. The receiver 120 may find a match with Dataset 2 and determine that "K" is unique within the plurality of datasets. In response to recognizing the dataset, the receiver 120 may associate the new portion with the recognized dataset. For example, the receiver 120 may update the Dataset 2 with the new portion and store the updated Dataset 2. The receiver 120 may provide feedback to transmitter 110 indicating that Dataset 2 has been updated. The previous Dataset 2 may be removed from the memory or kept and labeled as a previous version of Dataset 2. In following transmissions, the transmitter 110 may divide the updated dataset into different portions depending on various conditions such as for example the battery level indicator.

Instead, or in addition to, transmitting a new portion as illustrated in FIG. 10, the transmitter 110 may be configured to indicate deviation from the known set of datasets using partial data transmission. If one data portion of a dataset has changed after last transmission, the transmitter 110 may transmit the changed portion as the first portion. The receiver 120 may identify the first portion as an unknown portion. The receiver 120 may further request additional portion(s) to be transmitted. When transmitter 110 transmits a second portion, which is known to the receiver 120, the receiver 120 may identify the dataset based on the second portion. The signaling data may indicate a location of the changed portion. Based on the signaled location of the changed portion, the receiver 120 may update the indicated portion with the unknown data. Alternatively, the unknown first portion and at least one known second portion may be transmitted in one transmission.

According to an example embodiment, the first portion may comprise a key for a blockchain network. The key may lead to the right dataset which is located in the blockchain. Such dataset awareness may be made known to the receiver 120 for example by sending the key from the transmitter 110 to the receiver 120. New dataset verification to blockchain network (servers) may be done by blockchain principles.

FIG. 11 illustrates an example of definitions for signaling data, according to an example embodiment. The signaling table of FIG. 11 may be used to indicate information relating to surrounding data of the first and/or the at least one second portion. The first column may indicate an observation direction. For example, a value "0" of the first signaling bit may indicate that the following signaling data, e.g. bits, refers to data towards left from the portions associated with the signaling data, for example the first portion. A value "1" of the first signaling bit may indicate that the following signaling data refers to data towards right from the portions associated with the signaling data. The following signaling data may indicate the data next to the associated portion. For example, bits "00" may indicate that blocks or portions towards the observation direction until a next signaled block, e.g. a block associated with similar signaling data, are zeros ("0" content). Bits "11" may indicate that blocks or portions towards the observation direction until a next signaled block are ones ("1" content). Bits "01" may indicate that blocks or portions towards the observation direction until a next signaled block are not same as the portion associated with the signaling data. Bits "10" may indicate that blocks or portions towards the observation direction until a next signaled block are the same as the portion associated with the signaling data.

For example, the signaling data may indicate the location, for example location 1, in a case where a dataset portion corresponding to location 1 is to be transmitted in the first transmission. The control signaling part can indicate information relating to surrounding data parts of location 1. For example, if the locations 2, 3, 4, 5, 6, 7, 8, 9 have all zero bits (or one bits or similar bit stream), for example, the signaling data may include an indication that dataset portions towards right are zeros. After the first transmission, a second transmission may comprise a dataset portion corresponding to location 10. After receiving the second transmission the receiver 120 is able to reconstruct the dataset based on the received information comprising the first and second portions and the signaling data. Thus, the dataset can be efficiently indicated based on two transmissions.

Figure 12:
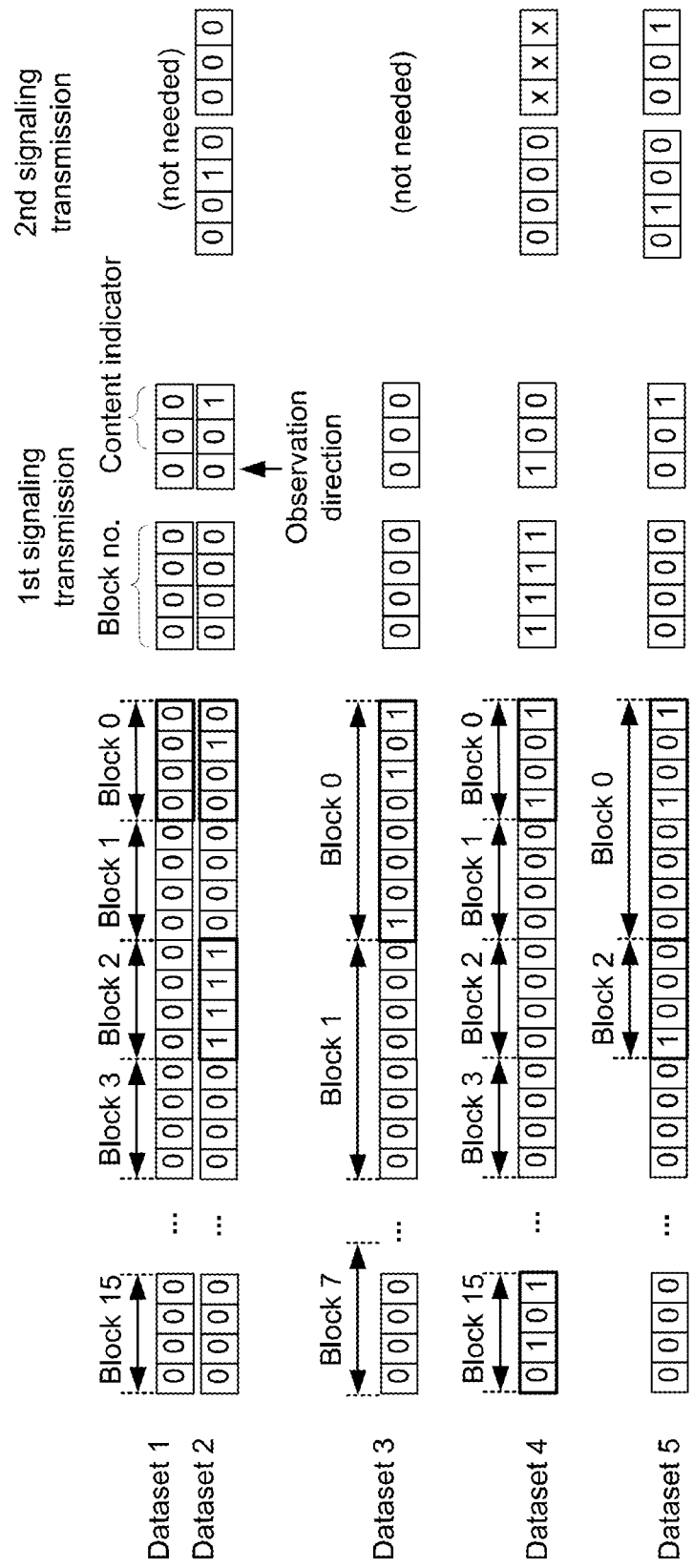
FIG. 12 illustrates an example of transmission of datasets based on signaling data, according to an example embodiment.

FIG. 12 illustrates an example of transmission of datasets based on signaling data, according to an example embodiment. Dataset 1 may be divided into sixteen blocks, each block comprising four bits. Block 0 may be transmitted as the first portion along with five signaling bits ($1^{st}$ signaling transmission). Four signaling bits may indicate the block number "0000". The remaining signaling bits "000" may indicate the observation direction to left and that content of next block in the observation direction are zeros (MSB 0=observation direction to left, LSBs 00=next block(s) content zeros). As illustrated in FIG. 12, one of the three remaining bits may indicate the observation direction. Two of the remaining bits may comprise a content indicator indicating for example the content of the next blocks in the observation direction, as described above. No further blocks or signaling need to be transmitted because the remaining blocks (Blocks 1 to 15) are zeros. Receiver is able to determine content of Dataset 1 based on Block 0 and the signaling data.

Dataset 2 may be divided into sixteen blocks, each block comprising four bits. Block 0 may be transmitted as the first portion along with seven signaling bits ($1^{st}$ signaling transmission). Four signaling bits may indicate the block number "0000". The remaining signaling bits may indicate the observation direction to left and that content of next block in the observation direction are zeros (MSB 0=observation direction to left, LSBs 00=next block(s) content zeros). Block 2 may be transmitted as the second portion along with seven signaling bits ($2^{nd}$ signaling transmission). Four signaling bits may indicate the block number "0010". The remaining signaling bits may indicate the observation direction to left and that content of next block (Block 3) in the observation direction is zeros (MSB 0=observation direction to left, LSBs 00=next block(s) content zeros). Based on the transmission of Block 2, the receiver may determine that Block 2 is not zero. The indication of the first signaling transmission about next block content being zero may be interpreted as an indication that block(s) until next transmitted block are zeros. If not further transmissions are received, the receiver 120 may determine content of Dataset 2 based on the two transmissions. Alternatively, receiver 120 may determine that Block 1 was zeros because it was implicitly indicated in the signaling that next block is not same, i.e. content between received and next block (Block 2) was zeros. The second signaling transmission indicated that next block includes zeros.

Dataset 3 may be divided into eight blocks, each block comprising eight bits. Block 0 may be transmitted as the first portion along with seven signaling bits ($1^{st}$ signaling transmission). Four signaling bits may indicate the block number "0000". The remaining signaling bits may indicate the observation direction to left and that content of next block in the observation direction are zeros (MSB 0=observation direction to left, LSBs 00=next block(s) content zeros). No further blocks or signaling need to be transmitted because the remaining blocks (Blocks 1 to 7) are zeros. Receiver is able to determine content of Dataset 1 based on Block 0 and the signaling data.

Dataset 4 may be divided into sixteen blocks, each block comprising four bits. Block 15 may be transmitted as the first portion along with seven signaling bits ($1^{st}$ signaling transmission). Four signaling bits may indicate the block number "1111". The remaining signaling bits may indicate the observation direction to right and that content of next block in the observation are zeros (MSB 1=observation direction to right, LSBs 00=next block(s) content zeros). Block 0 may be transmitted as the second portion along with seven (or just four) signaling bits ($2^{nd}$ signaling transmission). Four signaling bits may indicate the block number "0000". The remaining signaling bits may be set to any value since the Block 0 is the last block in the observation direction and the receiver 120 is aware of the size of the dataset. Alternatively, the three remaining signaling bits may not be transmitted. Based on the transmission of Block 0, the receiver may determine that Block 0 is not zero. The indication of the first signaling transmission about next block content being zero may be interpreted as an indication that block(s) until next transmitted block are zeros. Since Block 0 is the last block, the receiver 120 may determine content of Dataset 2 based on the two transmissions. Alternatively, the transmitter may indicate along with Block 15 that next block(s) are not the same. Receiver 120 may determine that blocks between Block 15 and Block 0 are zeros based on an implicit indication in signaling, for example based on an agreement that in case of such signaling all blocks between the signaled blocks are zeros. More signaling dimension may be get for example if agreed that if all blocks between two blocks are zeros we read towards left, and if all between two blocks are ones we read towards right.

Dataset 5 may be initially divided into eight blocks, each block comprising eight bits. Block 0 may be transmitted as the first portion along with seven signaling bits ($1^{st}$ signaling transmission). Four signaling bits may indicate the block number "0000". The remaining signaling bits may indicate the observation direction to left and that content of next block in the observation direction is not same (MSB 0=observation direction to left, LSBs 01=next block(s) content not same). The receiver may determine granularity be eight blocks based on the received block size and the known size of the dataset. Granularity may be changed dynamically to sixteen blocks, for example if the end of the next block with the lower granularity contains many zeros. In that case the transferred bit amount can be reduced by increasing the granularity to sixteen blocks. Block 2 may be transmitted as the second portion along with seven signaling bits ($2^{nd}$ signaling transmission). Four signaling bits may indicate the block number "0010". The receiver 120 may determine the granularity and location of the received block based on the size of the received block. The remaining signaling bits may indicate the observation direction to left and that content of next block in the observation direction is zeros (MSB 0=observation direction to left, LSBs 00=next block(s) content zeros)). No further blocks or signaling need to be transmitted because the remaining data towards left are zeros. Receiver is able to determine content of Dataset 5 based on Block 0 (lower granularity) and Block 2 (higher granularity) and the signaling data. An alternative way in case of Dataset 5 would be to divide the dataset into four blocks of sixteen bits. In that case, the transmitter 110 could transmit the longer Block 0 as the first portion and indicate that following content is zeros with signaling bits "000".

Note that above example embodiments are provided to describe some alternatives for transmission of blocks and signaling data. For example, more granularity can be achieved by adding more signaling bits. A target of the signaling is to minimize transmission of redundant or self-evident over radio interface. Signaling provides the benefits of avoiding redundant information transmission, avoiding transmission of information which may be indicated in a shorter way, and avoiding transmission of information which may be derived implicitly based on direct signaling and direct information content (e.g. block content). Rules interpreting the signaling and the information (block content) and how they are applied may be known both at the transmitter 110 and the receiver 120. Note that when the transmitter 110 or the receiver 120 changes the interpretation rule, the rule may be shared between the transmitter 110 and receiver 120 for future purposes. The interpretation rule may be changed also based on network load circumstances. For example, when network capacity is updated to be able to handle more incoming data, the interpretation rule may be changed to admit longer portion lengths than earlier.

According to an example embodiment, when the partial data transmission includes provision of the signaling data, as illustrated in FIG. 12, the receiver may be configured or requested to provide feedback, as discussed above.

Figure 13:
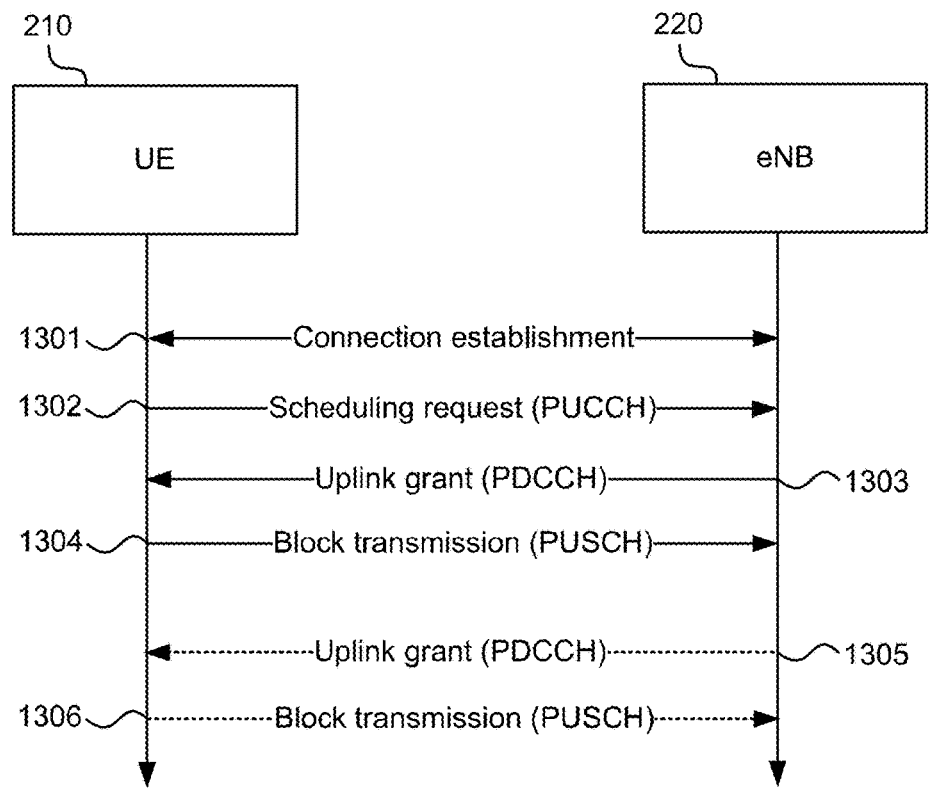
FIG. 13 illustrates an example of messaging between a user equipment and a base station, according to an example embodiment.

FIG. 13 illustrates an example of partial data transmission between a user equipment and a base station, according to an example embodiment.

At 1301, the UE 210 may establish a connection with eNB 220. The connection establishment may comprise a random access phase. For example, UE 210 may transmit a random access (RA) preamble, which may take various formats and which may for example comprise a signature identifying the UE 210. In general, the random access procedure may comprise a connection request to the eNB. The RA preamble may be transmitted for example on a physical random access channel (PRACH) and it may be used to obtain uplink synchronization between UE 110 and eNB 210 and to obtain resources for transmitting further data. After establishment of the connection the UE 210 may be in a connected state.

At 1302, the UE 210 may determine that it has data to be transmitted to eNB 220. For example, UE 210 may determine that it has received a dataset for transmission. The UE 210 may further transmit a scheduling request (SR) to the eNB 220 in order to request uplink transmission resources for the data transmission. As discussed above, the UE 210 may determine to transmit a portion of the data. Hence, the UE 210 may request uplink resources for the first portion of the dataset. The scheduling request may be transmitted for example on a physical uplink control channel (PUCCH).

At 1303, the eNB may respond to the scheduling request by transmitting an uplink (UL) grant to the UE 210. The uplink grant may be determined based on the scheduling request, for example based on an amount of data to be transmitted, which may be dependent on the size of the first portion of the dataset. The UL grant may indicate to transmission resources allocated to UE 210 for uplink transmission. The UL grant may be transmitted on a physical downlink control channel (PDCCH).

At 1304, the UE 210 may transmit the first portion, or block, using the uplink resources indicated in the UL grant received at 1303. The first portion may be transmitted as payload data, for example on a physical uplink shared channel (PUSCH). Also the signaling data may be included in the payload data If the UE 210 already knows that at least one second portion of the dataset is to be transmitted, it may further send another scheduling request to the eNB 220. The eNB 220 may receive the first portion and determine whether more data is needed to recognize the dataset. Alternatively, the first portion and the signaling data associated with the first portion may be included in signaling data portion of the uplink communication protocol. Therefore, the first portion may comprise user data (e.g. portion of the dataset) and not signaling data. Alternatively, the first portion may comprise user data and not the signaling data. The first portion may be included as payload data, for example in the uplink transmission. Alternatively, the first portion may be included in signaling data of the transmission protocol, for example the uplink transmission protocol. The same approach(es) may be applied in case of the at least one second portion.

At 1305, if more data is needed, the eNB 220 may transmit another uplink grant to allocate uplink transmission resources for at least one second portion of the dataset. Therefore the UE 210 may not need to transmit a scheduling request for the second and further portions of the dataset, which saves both power at the UE 210 and radio resources.

At 1306, the UE 210 may transmit another portion or block of the dataset using the resources allocated in the latest received uplink grant. The procedure may be repeated until the eNB 220 determines that is has successfully recognized the dataset. In response to determining that the dataset has been successfully received, the eNB 220 may determine not to transmit another uplink grant to UE 210. If the UE 210 does not receive another uplink grant, it may determine that eNB 220 has successfully recognized the dataset and may terminate transmission of the dataset. For example, the UE 210 may refrain from transmitting further scheduling requests to eNB 220 for transmitting portions of the same dataset.

Even though FIG. 13 illustrates the partial data transmission to take place after establishment of a connection between UE 210 and eNB 220, it is understood that there may be various other approaches. For example, UE 210 may transmit the first and/or at least one second portion already in an earlier phase to reduce signaling needs. The first and/or at least one second portion may be for example transmitted in the random access phase, for example in the RA preamble.

One way to save battery may be to use a wake-up receiver in the transmitter 110, for example UE 210. The wake-up receiver may be a very low power consumption receiver which may wake-up when a wake-up signal is received. Hence, there is no need for UE 120 to wake up periodically, for example to listen PDCCH scheduling. Receiving the wake-up signal may be considered as an indication to the UE 210 that it may send data. When the UE 210 receives the wake-up signal, it may transmit the first portion. When the transmitter 110 receives further wake-up signal(s), it may transmit the at least one second portion. The receiver 120 may also contain a wake-up receiver. The transmitter 110 may start transmission using the wake-up signal, which may cause the receiver 120 to wake-up. After wake-up signal transmission the transmitter 110 may transmit the first portion. The wake-up signal transmission may itself contain the first portion transmission, and further portions may be transmitted later on. The wake-up signal may be dedicated to a certain transmitter 110. For example, the wake-up signal may comprise an indication of which transmitter 110 it belongs to. For example, the wake-up signal may comprise an identifier of the transmitter 110. This reduces the need for data transmission between the transmitter 110 and the receiver 120. It also reduces power consumption at the transmitter 120, which may need to transmit the wake-up signal including the first portion.

Figure 14:
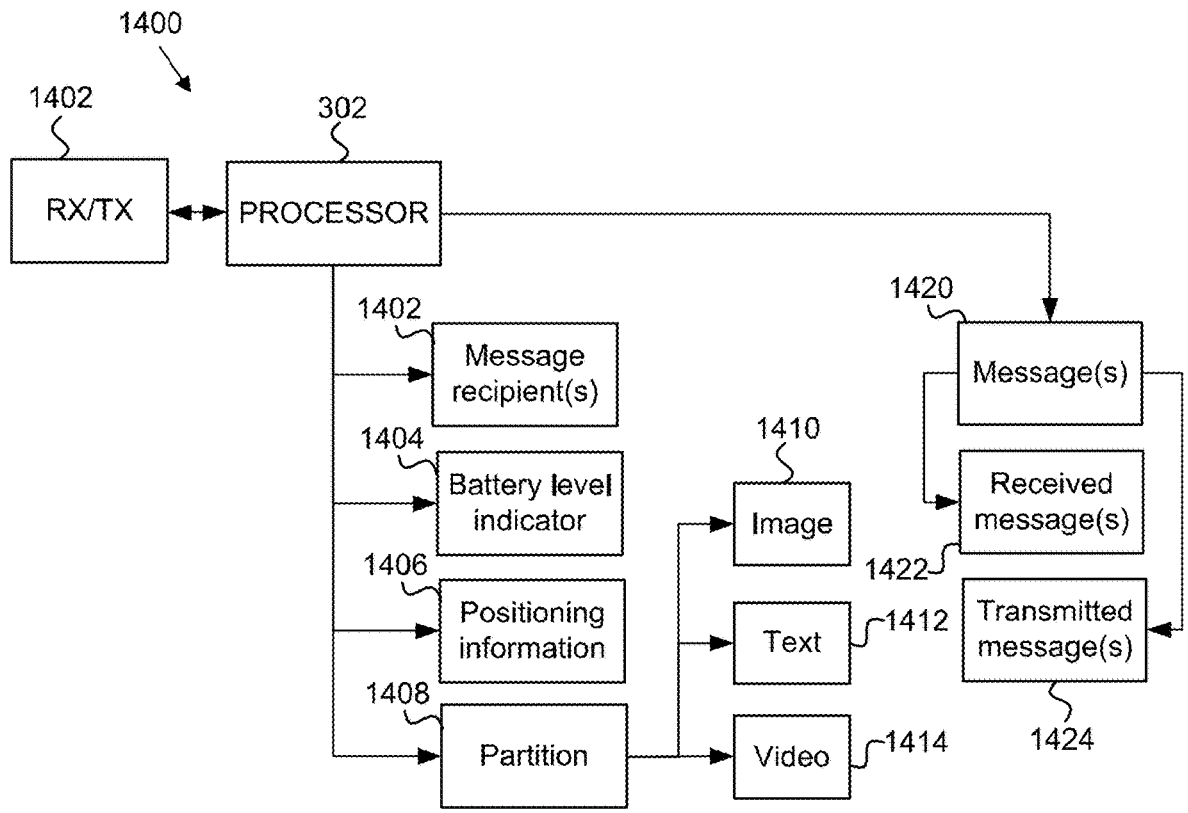
FIG. 14 illustrates an example of a block diagram of an apparatus, according to an example embodiment.

FIG. 14 illustrates an example of a block diagram of an apparatus, according to an example embodiment. The apparatus 1400 may for example comprise transmitter 110. The apparatus may comprise transmitter and/or receiver circuitry 1402, for example baseband and radio frequency circuitry, antenna(s), or the like, to enable apparatus 1400 to transmit and/or receive data. The apparatus 1400 may further comprise a processor 302 which may have access to various information such as for example a list of message recipients 1402, battery level indicator 1404, positioning information 1406, or the like. The processor 302 may control a dataset partitioning function 1408, which may have different configurations for different types of data such as for example image data 1410, text data 1412, or video data 1414. The apparatus 1400 may further store one or more messages 1420, for example received messages 1422 and/or transmitted messages 1424. The apparatus 1400 may be for example configured to keep log(s) of transmitted messages, received messages, and/or other operations.

Partitioning of datasets may be based on content type of the dataset. For text data 1412, for example a text stream, the apparatus 1400 may be configured to select a portion of the text data, which provides best or sufficient likelihood for recognition. For example, rare words which differentiate the text data from other text data may be selected as the first portion for transmission. The following portions may be selected in a similar fashion. For example the second rarest word may be selected for the next transmission, if needed. Also relative locations of words in the text data may be used as criteria for selecting portion(s) of the text data.

For image data, the apparatus 1400 may be configured to select a portion of the image that provides best or sufficient likelihood for recognizing the image. For example, if the image represents a face, a portion including an eye may be selected for the first transmission. A nose, or other parts of the face may be selected for further transmission(s), if needed. The transmitter 110 and receiver 120 may be configured with rules indicating order of transmission for the different parts of the face. In addition, it is worth to note that dataset splitting to smaller portions is applicable for any media formats, which include bit format presentations or are otherwise presentable and transferable from device to device using wired or wireless connection.

Different partitioning methods for text and image data may be used. The signalling data may comprise an indication of the type of the dataset and/or a purpose for the dataset, for example in the case that apparatus 1400 is multi-purpose device which is configured to send different types of information. If the apparatus 1400 is dedicated for face recognition purposes, the purpose is already known at the transmitter side. However, if the receiver is a multi-purpose device, the signaling data may be used to indicate the type and/or purpose of the dataset to the receiver 120. An indication of the type and/or purpose of the dataset may comprise and identifier of apparatus 1400. For example, the receiver 120 may determine the type and/or purpose of the dataset based on an identifier of an IoT device. In this case, type or purpose of the dataset may be indicated without additional signaling.

The data partitioning function may operate according to preconfigured rules. The rules may be preconfigured at transmitter 110 and receiver 120. Alternatively, the partitioning logic, for example the mapping between battery levels and data portion sizes, may be communicated from the transmitter 110 to the receiver 120.

FIG. 15 illustrates an example of a message log stored at an apparatus, according to an example embodiment. There are examples of two chains of messages. Server may be also other device like mobile device. The message log may be stored in any suitable format and may for example comprise a table with columns for indicating at least one of: an IoT device ID, has an IoT device received the request message, or not, from server, a destination where the portion of dataset message has been transmitted to, an order of the portion of the dataset message in the chain, an indication of where the message was received from (no means not received), a number of sent messages in the chain, a battery level associated with sending the portion of dataset message, an identifier of a chain associated with the message, a time of receiving the message from server, a type of the message, a size of the dataset message, content of the message such as for example a bit sequence, a total size associated with dataset messages sent for a particular dataset or chain, or indication of termination of the chain, for example relating to termination of exchange of communication of transmitter with server after enough parts of dataset have been received.

Messages may be associated with a chain. Transmissions associated with a dataset may be included in one chain. A transmitter 110 may transmit one or more chains, for example sequentially or in parallel. The first row of the table may for example indicate that the first message (Order of msg=1) is associated with a low battery level (15%) and that it belongs to a chain "Text1000". The log may further indicate that the first message was sent on 01012020-20:00:36, the size of the message "1/10" relative to the size of the dataset. The last column may indicate whether the transmission of the messages in the chain continued within 30 s.

The second row of the table may for example indicate that the battery level has remained at 15% and that upon transmission of the second message the total size of transmitted messages is "2/10". The second row may further indicate that the request message of requesting further portion of dataset was received from Server 1, and that the response message was transmitted from device A1. The second row may further indicate that the request message was received at 01012020-20:00:46 at device A1 and that response message was answered and sent at 01012020-20:00:56 to Server 1. Further it is indicated that they are belonging to same chain.

The third row of the table may for example indicate that the transmission was terminated after the third message was sent from transmitter, because the further request message was not received before termination time at 01012020-20:00:46 which is not within 30 s from the previous message sent at 20:00:16 in the same chain Text1000.

The fourth row depicts a new message of dataset relating to chain Text1001. In that case the size 1/10 has been enough data needed in server as there is no request message received from the Server 1 within the termination time and therefore there are no additional messages in the chain.

The table of FIG. 15 may be used to keep track of messages transmitted/received to/from different devices, for example to enables following ongoing transmission chains. Furthermore, the receiver 120 may be configured to interpret absence of transmission of a dataset, a portion of the dataset, and/or signaling data at a particular time in a particular way.

The time what the interval of the response message and request message or what the termination time should be, can be adjusted based on the different needs. Sometimes one second or even some parts of it can be enough, 10 ms or less as round trip time, for example, depending on technology used, 4G or 5G, for example.

Figure 16:
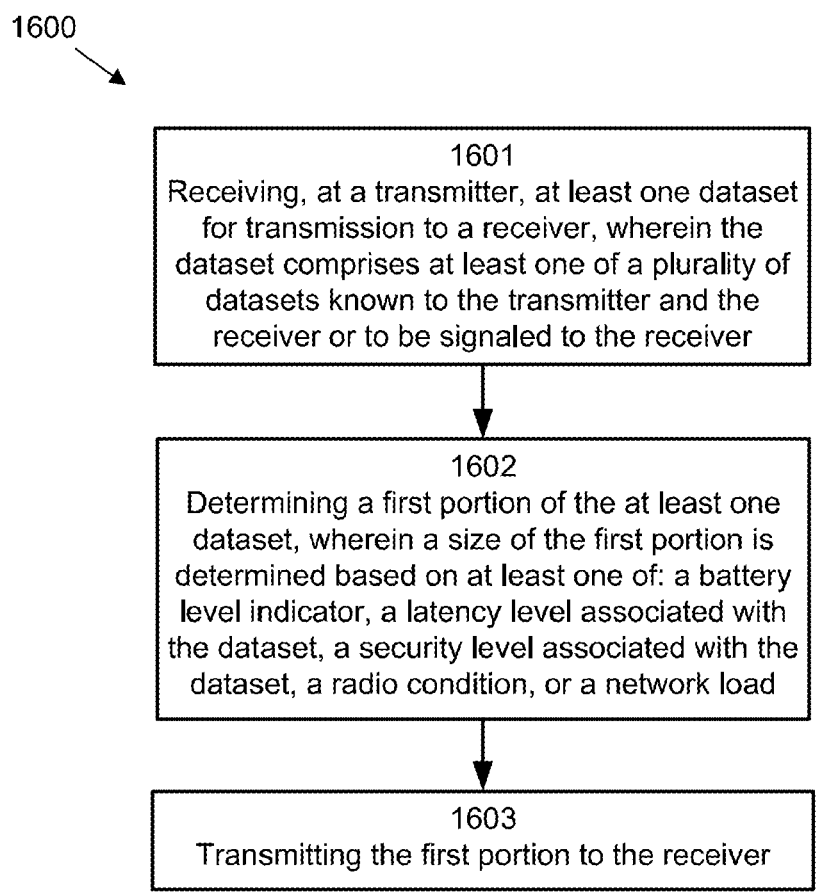
FIG. 16 illustrates an example of method for partial data transmission, according to an example embodiment.

FIG. 16 illustrates an example of a method 1600 for partial data transmission, according to an example embodiment.

At 1601, the method may comprise receiving, at a transmitter, at least one dataset for transmission to a receiver, wherein the dataset comprises at least one of a plurality of datasets known to the transmitter and the receiver or to be signaled to the receiver.

At 1602, the method may comprise determining a first portion of the at least one dataset, wherein a size of the first portion is determined based on at least one of: a battery level indicator, a latency level associated with the dataset, a security level associated with the dataset, a radio condition, or a network load.

At 1603, the method may comprise transmitting the first portion to the receiver.

Figure 17:
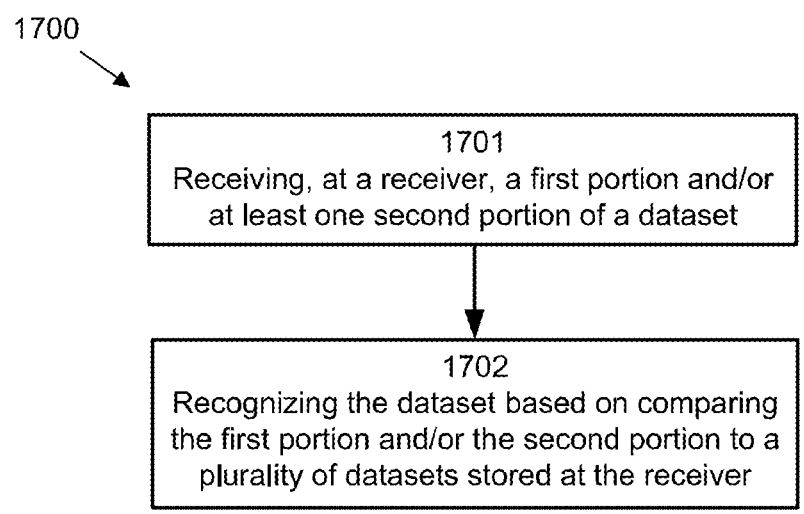
FIG. 17 illustrates an example of method for partial data reception, according to an example embodiment.

FIG. 17 illustrates an example of a method 1700 for partial data reception, according to an example embodiment.

At 1701, the method may comprise receiving, at a receiver, a first portion of a dataset and/or at least one second portion of the dataset.

At 1702, the method may comprise recognizing the dataset based on comparing the first portion and/or the at least one second portion to a plurality of datasets stored at the receiver.

Further features of the methods directly result from the functionalities and parameters of the transmitter 110 such as for example an IoT device 210 or 212, or receiver 120 such as for example an eNB 220, as described in the appended claims and throughout the specification. Different variations of the methods may be also applied, as described in connection with the various example embodiments.

The above methods may be exploited in various types of applications. For example, as mentioned above, a face may be recognized based on an eye, which may be provided as the first portion of the image. An eye of an image may be detected based on pixel data. The eye may be divided into pixels. If receiver 120 knows that question is about an eye, it may start face recognition by comparing the eyes of different faces. The receiver 120 may know or detect where the eye is located in each facial image. Additional signaling data may be also provided for indicating a larger area (e.g. in pixels) where the eye is located, for example by signaling xy-coordinates of the eye. The location of the eye may in some cases enable recognition of the face, if eyes are not located at the same place in other faces. In one example, the dataset may comprise an image of a face and the first portion may comprise an eye. In another example, the dataset may comprise an image of an eye or a face and the first portion may comprise an iris of the eye. A second portion may comprise rest of the eye.

Object recognition may be also based on applying a rough recognition when differentiating different objects from each other. For example, it may be sufficient to transmit pixels that make difference between objects. In this case, the receiver 120 may be configured with an image library or rule(s), which enable to make decisions when sufficient pixel information has been delivered from the transmitter 110 to the receiver 120. This approach may be applied even if transmitter 110 and receiver do not have exactly same datasets, but sufficient data for verification.

In case of three-dimensional (3D) content, the first portion may comprise a portion of a 3D object, for example a volume with a preconfigured or signaled xyz-location. For example, the first portion may comprise a particular part from a human body, such as for example the heart or a portion of the heart, which may be for example under monitoring in a medical application.

Example embodiments provide a partial data transmission system, where total amount of information to be transmitted may be divided into portion where granularity of the portions depend on battery/energy level or estimated battery/energy level of the transmitter 110. This is beneficial for the transmitter 110, for example because when battery level is low the transmitter may try to get a message through using smaller portion(s). In addition, this also saves receiver battery since the receiver 120 receives smaller information parts during a shorter time. When this functionality is built in addition to DRX (discontinuous reception) operation, the receiver 120 needs to be in active mode even a shorter time, which may further increase the power saving at receiver 120.

An apparatus, for example transmitter 110 or receiver 120 may be configured to perform or cause performance of any aspect of the method(s) described herein. Further, a computer program may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s). According to an example embodiment a system may comprises a first apparatus configured to perform method 1500 and a second apparatus configured to perform method 1600. According to an example embodiment, the system may comprise the transmitter 110 and the receiver 120.

According to an example embodiment, an apparatus may comprise means for receiving at least one dataset for transmission, wherein the dataset comprises at least one of a plurality of datasets; means for determining a first portion of the at least one dataset, wherein a size of the first portion is based on at least one battery level indicator; means for transmitting the first portion to another apparatus; means of receiving feedback from the other apparatus; and means for performing at least one operation based on the feedback or absence of the feedback, wherein the at least one operation comprises transmitting at least one second portion of the dataset or terminating transmission of the dataset.

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or apparatus may contain additional blocks or elements.

As used in this application, the term 'circuitry' may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims.

As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

Examples in paragraphs e.g. 0038, 0039, 0046, 0053, 0084 and 0085 in priority application may comprise at least the following examples 1 and/or 2.

Example 1. A device, comprising:
at least one processor; and at least one memory including computer program code, wherein the at least one memory and computer program code are configured, with the at least one processor, to cause the device to perform the following:
monitor by a device one or more passing objects;
detect at least one or more portions of the one or more passing objects;
recognize from the at least one or more portions of the one or more passing objects at least one or more identifiers, and transmit at least one or more portions of the at least one or more identifiers to a receiver, wherein the at least one or more portions is/are known to at least one of the device and/or a receiver.

Example 2. A device, comprising:
at least one processor; and at least one memory including computer program code, wherein the at least one memory and computer program code are configured, with the at least one processor, to cause the device to perform the following:
monitor by a device one or more passing objects;
detect at least one or more portions of the one or more passing objects;
transmit at least one or more portions to a receiver, wherein at least one or more identifiers is/are recognizable from the at least one or more portions; and wherein the at least one or more identifiers are known at the device and at the one or more passing receiver.

A device of example 2 wherein the portion may comprise a part of a serial number or a part of the identifier/s.

A device of example 2 wherein the identifier/s may comprise a serial number or numbers.

A device of example 2 wherein the device is configured to receive a portion of the identifiers from the passing object.

A device of example 2 wherein the device is configured to recognize the identifier/s based on the portion which comprises a part of the serial number.

Finding highest priority dataset for transmission. Selecting it. Defining first portion from it based on battery level indicator. Transmitting first portion.

Examples in paragraph e.g. 0055 in priority application may comprise at least the following example 3.

Example 3. An apparatus, comprising: at least one processor; and at least one memory including computer program code, wherein the at least one memory and computer program code are configured, with the at least one processor, to cause the apparatus to perform the following:
receive, at the apparatus, at least one dataset for transmission to a receiver, wherein the at least one dataset comprises at least one of a plurality of datasets known to at least one of the apparatus and/or the receiver or to be signaled to the receiver;
determine a transmission priority order between the plurality of datasets;
determine a dataset for transmission based on the priority order;
determine a size of a first portion from the determined dataset; and
transmit the first portion to the receiver.

The apparatus of the example 3, wherein the priority order or the size of the first portion is configured to base on at least a battery level indicator.

Examples in paragraphs e.g. 0074, 0082 and 0083 in priority application may comprise at least the following example 4.

Example 4. An apparatus, comprising:
at least one processor; and at least one memory including computer program code, wherein the at least one memory and computer program code are configured, with the at least one processor, to cause the apparatus to perform the following:
receive, at the apparatus, a first portion of a dataset from a transmitter;
recognize the dataset based on comparing the first portion to a plurality of datasets stored at the apparatus;
determine a feedback to the transmitter in response to receiving the first portion of the dataset;
the feedback determination is based on at least one of:
an apparatus battery level indicator;
an apparatus latency requirement for a dataset;
a transmitter battery level indicator;
a transmitter battery level indicator based on received size of the first portion of the dataset; and/or
a transmitter battery level indicator determination is based on a size of the first portion, wherein the size of the first portion changes between the receptions;
wherein the determined feedback comprising at least one of postpone transmission of the determined feedback; or send the feedback to the transmitter.

For example, transmitter changed to apparatus i.e. keeping in one entity.

Examples in paragraphs e.g. 0086 and 0115-0117 in priority application may comprise at least the following example 5.

Example 5. An apparatus, comprising:
at least one processor; and at least one memory including computer program code, wherein the at least one memory and computer program code are configured, with the at least one processor, to cause the apparatus to perform the following:
receive, at the apparatus, at least one dataset for transmission to a receiver, wherein the dataset comprises at least one of a plurality of datasets;
determine a content type of the dataset, wherein the content type of the dataset is at least one of:
a text stream, a video data or an image data,
determine a portion from the determined dataset, wherein the portion is determined based on at least one of:
a likelihood for recognition at the receiver,
a differentiative characteristic,
rare word,
a face, and/or
an eye,
select the portion, and
transmit the portion to the receiver.

Examples in paragraphs e.g. 0096-0103 in priority application may comprise the following examples 6 and/or 7.

Example 6. An apparatus, comprising:
at least one processor; and at least one memory including computer program code, wherein the at least one memory and computer program code are configured, with the at least one processor, to cause the apparatus to perform the following:
divide a dataset to at least one block, wherein a size of the block is determined based on at least one of:
a battery level indicator,
a latency level associated with the dataset,
a security level associated with the dataset,
a radio link condition,
a network load,
the dataset content in an observation direction to left from the block,
the dataset content in an observation direction to right from the block, and/or
a dynamic block size change based on needed granularity with the dataset,
select the block, and
transmit the block.

Example 7. An apparatus, comprising:
at least one processor; and at least one memory including computer program code, wherein the at least one memory and computer program code are configured, with the at least one processor, to cause the apparatus to perform the following:
determine a signaling data for a block in a dataset, wherein the signaling data determination is based on the at least one of:
a block number within the dataset,
an observation direction to left from the block,
an observation direction to right from the block,
the dataset content before or after the block is zero(s),
the dataset content before or after the block is one(s), and/or
the dataset content in one or more next block(s) before or after the block is substantially same as in the block,
select the signaling data, and
transmit the signaling data.

The invention claimed is:

1. An apparatus, comprising:
at least one processor; and
at least one memory including computer program code, wherein the at least one memory and computer program code are configured, with the at least one processor, to cause the apparatus to:
receive, at the apparatus, at least one dataset for transmission to a receiver, wherein the at least one dataset comprises at least one of a plurality of datasets known to the apparatus and the receiver or to be signaled to the receiver;
determine a first portion of the at least one dataset, wherein a size of the first portion is determined based on at least one of:
a battery level indicator,
a latency level associated with the at least one dataset,
a security level associated with the at least one dataset,
a radio link condition, or
a network load,
determine a location of the first portion, such that the first portion is unique within the plurality of datasets at the determined location;
transmit the first portion to the receiver; and
transmit the at least one dataset, in response to determination that an estimate of a required capacity for transmission of the first portion and at least one second portion exceeds an estimate of a required capacity for transmitting the at least one dataset; or
transmit the at least one second portion in addition to the first portion, in response to determination that the first portion is not unique within the plurality of datasets and that a combination of the first portion and the at least one second portion is unique within the plurality of datasets.

2. The apparatus according to claim 1, wherein the at least one memory and computer program code are further configured, with the at least one processor, to cause the apparatus to:
receive feedback from the receiver; and
perform at least one operation based on a feedback or absence of the feedback, wherein the at least one operation comprises transmission of the at least one second portion of the at least one dataset or termination of transmission of the at least one dataset.

3. The apparatus according to claim 1,
wherein the size of the first portion is determined based on the battery level indicator, and
wherein the battery level indicator comprises at least one of:
a charge level of the battery;
estimated battery usage before a charging opportunity;
estimated battery usage for the transmission of the at least one dataset;
estimated battery usage for transmission of the first portion at current radio conditions or at current network load level; or
estimated battery usage under current operating conditions of the apparatus.

4. The apparatus according to claim 1, wherein the at least one memory and computer program code are further configured, with the at least one processor, to cause the apparatus to:
determine the size of the first portion based on a plurality of battery level thresholds mapped to a corresponding plurality of data portion sizes.

5. The apparatus according to claim 1, wherein the at least one memory and computer program code are further configured, with the at least one processor, to cause the apparatus to:

transmit the plurality of datasets to the receiver.

6. The apparatus according to claim 1, wherein the first portion comprises a new portion not initially associated with the at least one dataset and wherein the apparatus is further caused to transmit an indication of the first portion being the new portion not initially associated with the at least one dataset.

\* \* \* \* \*